(12) United States Patent
Whittemore

(10) Patent No.: US 9,784,287 B2
(45) Date of Patent: *Oct. 10, 2017

(54) FILTER MOUNTS FOR A PORTABLE FAN AND METHODS FOR MOUNTING A FILTER TO A PORTABLE FAN

(71) Applicant: Zipwall LLC, Arlington, MA (US)

(72) Inventor: Jeffrey P. Whittemore, Arlington, MA (US)

(73) Assignee: Zipwall, LLC., Arlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,195

(22) Filed: Oct. 7, 2015

(65) Prior Publication Data

US 2016/0025110 A1   Jan. 28, 2016

Related U.S. Application Data

(63) Continuation of application No. 14/448,350, filed on Jul. 31, 2014, now Pat. No. 9,458,862, which is a
(Continued)

(51) Int. Cl.
*B01D 46/00* (2006.01)
*B01D 46/10* (2006.01)
(Continued)

(52) U.S. Cl.
CPC ......... *F04D 29/703* (2013.01); *B01D 46/001* (2013.01); *B01D 46/0005* (2013.01);
(Continued)

(58) Field of Classification Search
CPC ......... B01D 46/00; B01D 46/10; F04D 29/52; F04D 19/00; F01D 5/12; F01D 29/64; F01D 29/70; F24F 13/28; F24F 3/16; F24F 1/00
(Continued)

(56) References Cited

U.S. PATENT DOCUMENTS 2,532,162 A   11/1950   Goss
2,575,499 A   11/1951   Manow
(Continued)

FOREIGN PATENT DOCUMENTS

WO   9710479   3/1997
WO   0000775   1/2000
WO   0205929   1/2002

OTHER PUBLICATIONS

"Filter Mounts for a Portable Fan and Methods for Mounting a Filter to a Portable Fan" Specification, Drawings, Claims, and Prosecution History of U.S. Appl. No. 12/691,219, filed Jan. 21, 2010, by Jeffrey P. Whittemore.
(Continued)

*Primary Examiner* — Jacob T Minskey
*Assistant Examiner* — Minh-Chau Pham
(74) *Attorney, Agent, or Firm* — Onello & Mello, LLP

(57) ABSTRACT

A filter frame is removably attachable to a box fan. The filter frame is adapted for receiving a standard HVAC-style filter for removing contaminants from air flow induced by the fan. In this manner, a cost-effective means for filtering a flow of air is provided for residential and commercial settings. The filter frame is adaptable to a variety of standard box fan types of different styles and dimensions. The frame is configured to accommodate standard filters, such as those readily available from retail hardware stores and home centers.

16 Claims, 20 Drawing Sheets

Related U.S. Application Data continuation of application No. 14/062,271, filed on Oct. 24, 2013, now Pat. No. 8,801,824, which is a continuation of application No. 13/713,756, filed on Dec. 13, 2012, now Pat. No. 8,591,619, which is a continuation of application No. 13/403,362, filed on Feb. 23, 2012, now Pat. No. 8,349,047, which is a continuation of application No. 13/022,921, filed on Feb. 8, 2011, now Pat. No. 8,137,426, which is a continuation of application No. 12/691,219, filed on Jan. 21, 2010, now Pat. No. 7,905,938, which is a continuation of application No. 11/344,749, filed on Feb. 1, 2006, now Pat. No. 7,670,401, which is a continuation of application No. 60/737,190, filed on Nov. 16, 2005, which is a continuation of application No. 60/661,529, filed on Mar. 14, 2005, which is a continuation of application No. 60/648,892, filed on Feb. 1, 2005.

(51) Int. Cl.
| | | |
|---|---|---|
| F04D 29/52 | (2006.01) | |
| F04D 19/00 | (2006.01) | |
| F01D 5/12 | (2006.01) | |
| F24F 13/28 | (2006.01) | |
| F24F 3/16 | (2006.01) | |
| F24F 1/00 | (2011.01) | |
| F04D 29/70 | (2006.01) | |
| F04D 29/64 | (2006.01) | |

(52) U.S. Cl.
CPC ......... *B01D 46/0012* (2013.01); *B01D 46/10* (2013.01); *F01D 5/12* (2013.01); *F04D 19/002* (2013.01); *F04D 29/522* (2013.01); *F04D 29/644* (2013.01); *F04D 29/646* (2013.01); *F24F 3/1603* (2013.01); *F24F 13/28* (2013.01); *B01D 2265/024* (2013.01); *B01D 2271/02* (2013.01); *B01D 2273/30* (2013.01); *F05D 2240/90* (2013.01); *F24F 2001/0096* (2013.01)

(58) Field of Classification Search
USPC ......... 55/471, 481, 506, 480, 490, 491, 493, 55/501, 511, DIG. 31; 415/121.2; 416/247 R; 248/224.7
See application file for complete search history.

(56) References Cited

U.S. PATENT DOCUMENTS

| | | | |
|---|---|---|---|
| 2,992,701 A | 7/1961 | White | |
| 3,500,738 A | 3/1970 | Wenig | |
| 3,523,409 A | 8/1970 | Paterson | |
| 3,577,710 A | 5/1971 | Feldman | |
| 3,740,934 A | 6/1973 | Shuler | |
| 3,802,168 A | 4/1974 | Deckas | |
| 3,999,969 A | 12/1976 | Shuler | |
| 4,477,272 A | 10/1984 | Hollis et al. | |
| 4,512,245 A | 4/1985 | Goldman | |
| 4,626,265 A | 12/1986 | Adiletta | |
| 4,781,526 A | 11/1988 | Mead | |
| 5,156,662 A | 10/1992 | Downing et al. | |
| 5,221,180 A | 6/1993 | Crider | |
| 5,462,569 A | 10/1995 | Benjamin | |
| 5,474,427 A | 12/1995 | Redetzke | |
| 5,525,145 A | 6/1996 | Hodge | |
| 5,529,593 A | 6/1996 | Simmons | |
| 5,573,563 A | 11/1996 | Odom et al. | |
| 5,690,719 A | 11/1997 | Hodge | |
| 5,762,665 A | 6/1998 | Abrahamian et al. | |
| 5,863,310 A | 1/1999 | Brown et al. | |
| 5,868,189 A | 2/1999 | Jarvis | |
| D408,513 S | 4/1999 | Reede | |
| 5,904,744 A | 5/1999 | Kagan | |
| D420,117 S | 2/2000 | Gieseke et al. | |
| 6,030,427 A | 2/2000 | Sorice et al. | |
| 6,045,329 A | 4/2000 | Sobala | |
| 6,156,089 A | 12/2000 | Stemmer et al. | |
| 6,174,340 B1 | 1/2001 | Hodge | |
| 6,264,727 B1 | 7/2001 | Elmore | |
| 6,361,578 B1 | 3/2002 | Rubinson | |
| 6,389,832 B1 | 5/2002 | Wu | |
| 6,440,190 B1 | 8/2002 | Goyetche | |
| 6,527,838 B2 | 3/2003 | Volo et al. | |
| 6,533,835 B2 * | 3/2003 | Wilson | B01D 46/0002 55/385.1 |
| 6,716,267 B2 * | 4/2004 | Lawlor, Sr. | B01D 46/001 55/493 |
| 6,793,703 B1 * | 9/2004 | Sledge | B01D 46/0002 55/495 |
| 6,874,209 B2 | 4/2005 | Volo et al. | |
| 7,323,028 B2 | 1/2008 | Simmons | |
| 7,393,272 B2 * | 7/2008 | Sundet | F24F 13/28 416/247 R |
| 7,670,401 B2 * | 3/2010 | Whittemore | B01D 46/0005 415/121.2 |
| 7,905,938 B2 * | 3/2011 | Whittemore | B01D 46/0005 55/471 |
| 8,137,426 B2 * | 3/2012 | Whittemore | B01D 46/0005 55/471 |
| 8,349,047 B2 * | 1/2013 | Whittemore | B01D 46/0005 55/471 |
| 8,591,619 B2 * | 11/2013 | Whittemore | B01D 46/0005 415/121.2 |
| 8,801,824 B2 * | 8/2014 | Whittemore | B01D 46/0005 415/121.2 |
| 9,458,862 B2 * | 10/2016 | Whittemore | B01D 46/0005 |
| 2005/0166758 A1 | 8/2005 | Volo et al. | |
| 2010/0115898 A1 | 5/2010 | Whittemore | |
| 2011/0126500 A1 | 6/2011 | Whittemore | |
| 2012/0148399 A1 | 6/2012 | Whittemore | |
| 2013/0118137 A1 | 5/2013 | Whittemore | |
| 2014/0047805 A1 | 2/2014 | Whittemore | |
| 2014/0341725 A1 | 11/2014 | Whittemore | |

OTHER PUBLICATIONS

"Filter Mounts for a Portable Fan and Methods for Mounting a Filter to a Portable Fan" Specification, Drawings, Claims, and Prosecution History of U.S. Appl. No. 11/344,749, filed Feb. 1, 2005, by Jeffrey P. Whittemore.

"Filter Mounts for a Portable Fan and Methods for Mounting a Filter to a Portable Fan" Specification, Drawings, Claims, and Prosecution History of U.S. Appl. No. 13/403,362, filed Feb. 8, 2011, by Jeffrey P. Whittemore.

"Filter Mounts for a Portable Fan and Methods for Mounting a Filter to a Portable Fan" Specification, Drawings, Claims, and Prosecution History of U.S. Appl. No. 13/403,362, filed Feb. 23, 2012, by Jeffrey P. Whittemore.

"Filter Mounts for a Portable Fan and Methods for Mounting a Filter to a Portable Fan" Specification, Drawings, Claims, and Prosecution History of U.S. Appl. No. 13/713,756, filed Dec. 13, 2012, by Jeffrey P. Whittemore.

"Filter Mounts for a Portable Fan and Methods for Mounting a Filter to a Portable Fan" Specification, Drawings, Claims, and Prosecution History of U.S. Appl. No. 14/062,271, filed Oct. 24, 2013, by Jeffrey P. Whittemore.

"Filter Mounts for a Portable Fan and Methods for Mounting a Filter to a Portable Fan " Specification, Drawings, Claims, and Prosecution History of U.S. Appl. No. 14/448,350, filed Jul. 31, 2014, by Jeffrey P. Whittemore.

\* cited by examiner

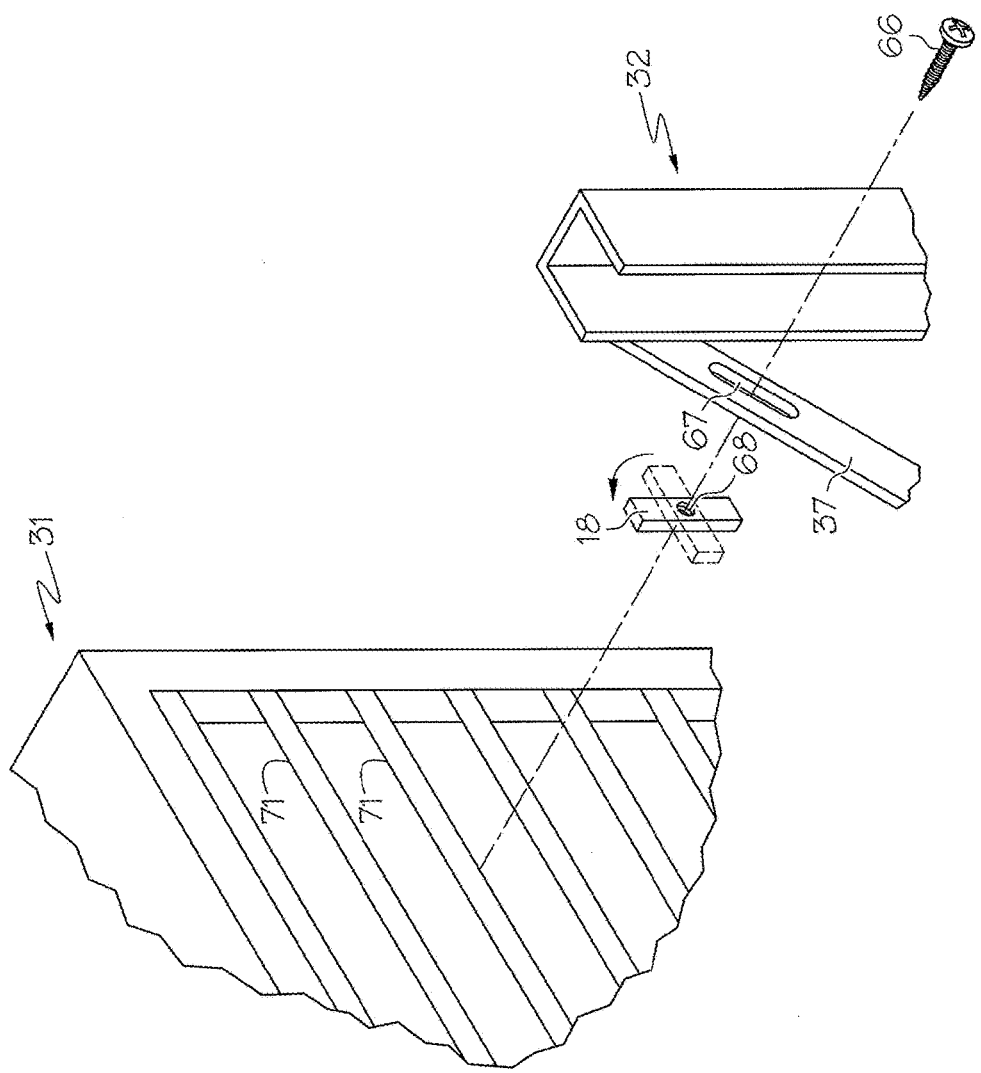

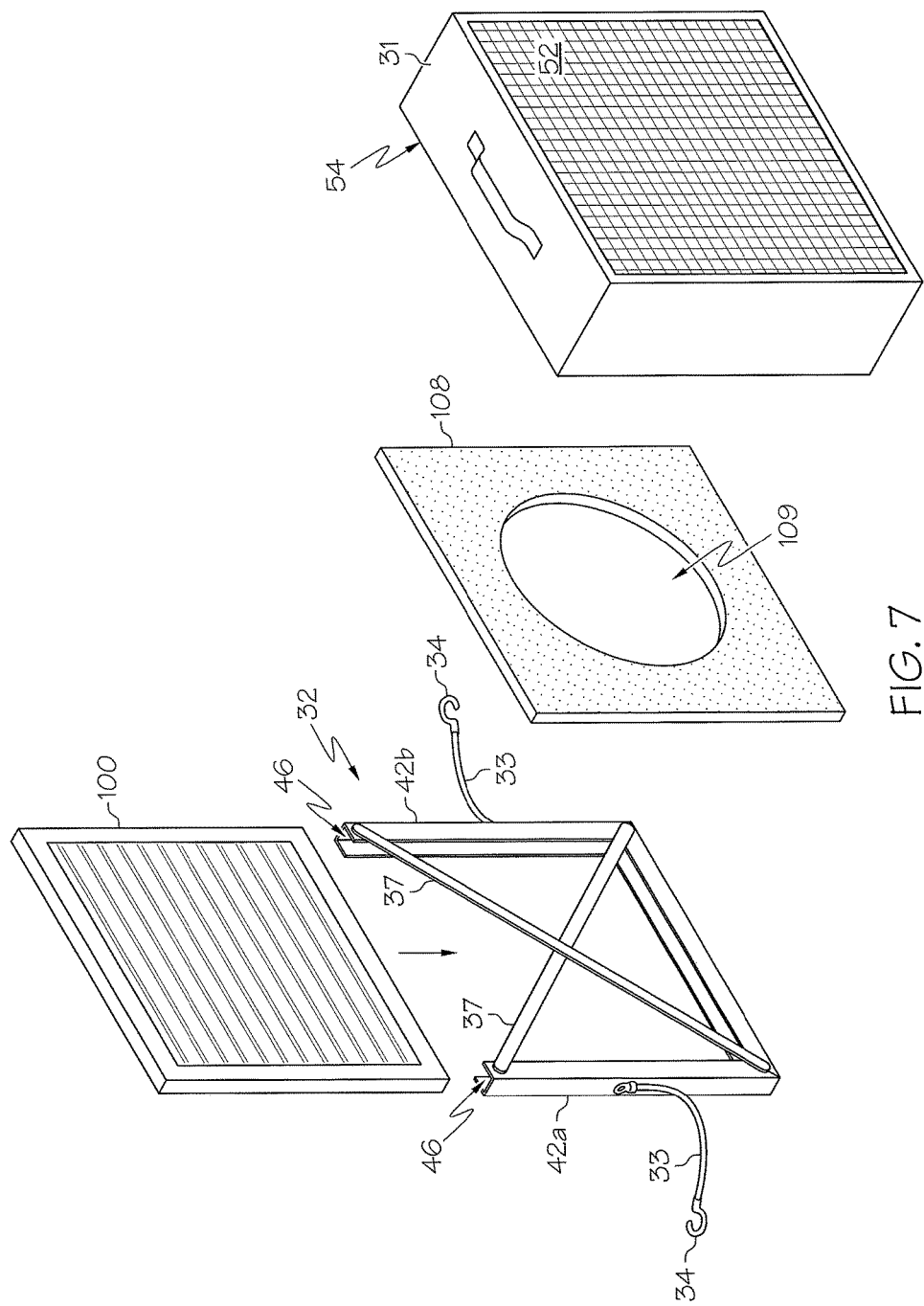

FILTER MOUNTS FOR A PORTABLE FAN AND METHODS FOR MOUNTING A FILTER TO A PORTABLE FAN

RELATED APPLICATIONS

This application is a continuation application of U.S. application Ser. No. 14/448,350, filed on Jul. 31, 2014 which is a continuation application of U.S. application Ser. No. 14/062,271, filed on Oct. 24, 2013, now U.S. Pat. No. 8,801,824 B2 which is a continuation application of U.S. application Ser. No. 13/713,756, filed Dec. 13, 2012, now U.S. Pat. No. 8,591,619, which is a continuation application of U.S. application Ser. No. 13/403,362, filed on Feb. 23, 2012, now U.S. Pat. No. 8,349,047, which is a continuation application of U.S. application Ser. No. 13/022,921, filed Feb. 8, 2011, now U.S. Pat. No. 8,137,426, which is a continuation of U.S. application Ser. No. 12/691,219, filed on Jan. 21, 2010, now U.S. Pat. No. 7,905,938, which is a continuation application of U.S. application Ser. No. 11/344,749, filed Feb. 1, 2006, now U.S. Pat. No. 7,670,401, which claims the benefit of U.S. Provisional Application Ser. No. 60/648,892, filed Feb. 1, 2005, U.S. Provisional Application Ser. No. 60/661,529 filed Mar. 14, 2005, and U.S. Provisional Application Ser. No. 60/737,190, filed Nov. 16, 2005, the contents of each of which are incorporated herein by reference, in their entirety.

BACKGROUND OF THE INVENTION

Portable fans, such as box fans, are popular as a cost-efficient means for cooling or ventilating interior areas of commercial and residential buildings. Box fans are inexpensive, light, and portable, and can be easily repositioned to provide a desired interior air flow.

Filters have been applied to box fans as a means for removing air-borne contaminants from the air flow. A number of mounting configurations have been devised that secure a filter to a box fan. U.S. Design Pat. No. DES 377,390 discloses a filter mount that is incorporated within the body of a box fan. This configuration requires a specialized fan chassis, and therefore is not applicable to general-purpose box fans. U.S. Pat. No. 4,781,526 discloses a filter mount that is affixed to an exterior portion of a fan body. In this configuration, the filter bracket is permanently affixed to holes formed in the fan body using specialized mounting hardware, such as machine screws. U.S. Pat. No. 6,527,838 discloses a filter mount including a plurality of brackets that adhere to a side surface of the fan. The brackets are permanently affixed to the fan, and take the form of specialized hardware, which, when mounted to a particular fan body, cannot be re-used on another fan. In alternative embodiments disclosed in the U.S. Pat. No. 6,527,838, a filter bracket is applied to a fan body using hook and loop fasteners or screws about a periphery of the body of the fan. Again, such specialized attachment hardware is semi-permanent, can disfigure the fan body, and cannot be re-used on another fan.

SUMMARY OF THE INVENTION

The present invention is directed to a filter mount for a box fan. A filter mount in the form of a frame is removably mountable to a fan chassis and does not cause any permanent disfigurement to the fan body. The filter frame is adapted and shaped to receive a standard air filter, such as the type of filter commonly used in residential heating systems. The filter and frame are preferably sized to closely match, and cover, a standard-sized fan grill at the input or output face of the fan, so that a substantial amount of air flow passes through the filter.

The filter frame is preferably sized to have a narrow profile so as not to inhibit the air flow induced by the fan. In one embodiment, straps are provided to secure the frame to the fan body, such that the frame is readily removable. In one embodiment, the straps comprise elastic bands. Tension in the elastic bands, when mounted, secures the filter frame to the fan chassis. The elastic bands are optionally adjustable in length so that the filter frame is compatible with a variety of fan chassis types and a variety of fan chassis thicknesses.

In another embodiment, the frame includes features that attach to a grill of a fan, for example, features that mate with one or more grill apertures. The frame can include, for example rigid pegs or hooks that are inserted in one or more grill apertures at one of a top and bottom of the fan grill, and spring-loaded hooks that are inserted in one or more grill apertures at the other of the top and bottom of the fan grill to secure the frame in place against the fan grill.

In another embodiment, a filter frame can be integrated directly into the grill of the fan. In this embodiment, the fan grill can be formed in a molding process to include integral filter guides at left side, right side, and bottom side portions of the fan grill. In this manner, the fan grill includes an integral filter frame that can accept standard-sized filters.

In this manner, a cost-effective means for filtering a flow of air is provided for residential and commercial settings. The filter frame is adaptable to a variety of standard box fan types of different styles and dimensions. The frame is configured to accommodate standard filters, such as those readily available from retail hardware stores and home centers.

In one embodiment, the filter frame includes one or more elastic bands, or bungy cords. Each elastic band is attached at a first end to one of the side members of the filter frame. A second end of each elastic band includes a hook that is adapted to attach to one of the front and rear grills of the fan, or other feature of the fan. The frame is mounted to one face of the fan body, and the elastic band or bands stretch about the sides of the fan to the other face of the fan body. The hooks operate in conjunction with the tension in the stretched band or bands to secure the filter frame to the fan body.

In one embodiment, a single pair of bands is employed, one band interfacing with each respective left and right side member of the frame at or near a central position of the side members. In some configurations, a single pair of bands is sufficient for securing the frame to the fan body. In another embodiment, where additional securing force is required, multiple pairs of bands are employed, each band of each pair interfacing with a left or right side member at top and bottom regions of the side members.

The elastic bands may be permanently attached to the frame, for example, by rivets or screws, or by tying the bands to the frame. Alternatively, the elastic bands are removable from the frame, for example, by hooks, buttons, loops, or other attachment mechanisms. One end, or both ends, of each elastic band can be removably or permanently attached to the frame.

In an embodiment where both ends of each elastic band attach to the frame, one or more of the bands loop around the fan body, for example over the top, bottom, left and/or right sides of the fan body, to secure the frame to the fan body. As mentioned above, the ends of each elastic band may be permanently or removably attached to the frame.

In an embodiment where a first end of each elastic band is attached to the frame, the second end includes a hook for attaching the elastic band to a feature of the fan chassis, for example, a fan grill, handle, or other feature. In another embodiment, elastic bands from left and right sides of the frame each include hooks, or other clasping features, such that the second ends of paired elastic bands can be coupled to each other to form one large band that extends about the fan chassis. In another embodiment, the frame includes pegs that extend from the frame and extend between adjacent cross members of the rear or front grill of the fan, such that the pegs prevent the frame from shifting or sliding relative to the cross members.

In another embodiment, the filter frame includes mounting knobs at spaced-apart coupling locations, and the elastic bands each include an array of holes at first ends of the bands. The holes of the elastic bands mate with the coupling knobs as a convenient mechanism for removably attaching the elastic bands to the filter frame. The second ends of the elastic bands may include hooks, as described above, for attaching to a fan chassis feature. Alternatively, the elastic bands include an array of holes at both ends, and the bands stretch about the body of the chassis, and couple to both sides of the frame. The mounting knobs secure the bands, and retain the elastic bands in a tensioned state, securing the filter frame to the fan. The array of holes are distributed along the length of the end of each band to allow for adjustment in the length of the elastic band. In this manner, the filter frame is adapted to accommodate fan bodies of different thicknesses.

In another embodiment, the filter frame is secured to the fan chassis by elongated bolts that extend through the body of the fan. Holes are included in the frame to receive the bolts. The holes are preferably elongated to allow for play in positioning the frame relative to the fan body, so that the frame is compatible with different fan grill configurations. The elongated bolts are secured to the filter frame and fan with washers and wing nuts, which, when tensioned, retain the filter frame against the body of the fan. The bolts are configured so as to avoid interference with fan operation.

In another embodiment, the filter frame is secured to the fan chassis using fasteners that are bolted to the frame. In one embodiment, the fastener is inserted into the fan grill in a horizontal position between cross members of the rear or front grill of the fan, and is then rotated to a vertical position and tightened in place to affix the filter frame to the fan. The fastener is sized to accommodate a range of fan grill configurations.

In an alternative embodiment, the frame is attached to the rear or front grill of a fan with standard cable ties.

In another embodiment, the filter frame is unitary and formed in a molding process, for example in a straight-pull injection molding process.

In another embodiment, the filter frame is adapted to receive multiple filters.

In another embodiment, the filter frame is unitary and formed in a molding process and includes spring-loaded hooks for securing the filter frame to the grill of the fan.

In another embodiment, the filter frame is integral with the front or rear grill of the fan body. The filter frame is molded on an outer portion of the front or rear grill, the filter frame and the front or rear grill being unitary.

In one aspect, the present invention is directed to a removable filter frame for a fan. A frame body includes opposed first and second side channels. Each of the first and second side channels has a longitudinal axis and the first and second side channels define a slot for insertion of an air filter. The slot has an upper end that allows for insertion and removal of an air filter, and a lower end that includes a stop for restricting further movement of an inserted air filter. The removable filter frame further comprises a coupler that extends from the frame body in a direction transverse to the longitudinal axes of the first and second side channels. The coupler is constructed and arranged to couple the frame body to a grill of a fan.

In one embodiment, the frame body is unitary. Further, in another embodiment, the frame body is formed in a straight-pull injection molding process.

In another embodiment, the first and second side channels of the frame body are formed as separate units that are mounted together.

In another embodiment, the frame body further includes at least one cross member between the first and second side channels that provides for lateral rigidity to the frame body.

In another embodiment the first and second side channels each comprise a side surface of the frame body and tabs that extend from the frame body in a horizontal direction to define the first and second side channels.

In another embodiment, the stop is positioned at a bottom of at least one of the first and second side channels. In another embodiment, the stop comprises a portion of the frame body that extends in a horizontal direction between the longitudinal axes of the first and second side channels. Further, in another embodiment, the stop comprises a horizontal channel extending in the horizontal direction between bottom portions of the first and second side channels.

In another embodiment, the coupler comprises at least one tab that extends from the frame body and is constructed and arranged to couple the frame body to a grate of a grill of a fan.

In another embodiment, the coupler comprises at least one hook that extends from the frame body and is constructed and arranged to couple the frame body to a grate of a grill of a fan. In another embodiment, the at least one hook is spring-loaded.

In another embodiment, the coupler comprises one of multiple fasteners, multiple elongated bolts, and multiple cable ties that extend from the frame body and are constructed and arranged to couple the frame body to a grate of a grill of a fan.

In another embodiment, the removable filter frame further comprises elastic bands that are coupled to the frame body and are constructed and arranged to couple about a chassis of a fan.

In another embodiment, the removable filter frame further comprises a foam pad coupled between the frame body and a grill of a fan.

In another embodiment, the first side channel and the second side channel are constructed to have a depth such that multiple filters can be inserted in the frame body.

In another aspect, the present invention is directed to a removable filter frame for a fan. A frame body includes opposed first and second side channels. The first and second side channels define a slot for insertion of an air filter. The slot has an upper end that allows for insertion and removal of an air filter, and a lower end that includes a stop for restricting further movement of an inserted air filter. At least one elastic band is coupled to the frame body, the at least one elastic band is constructed and arranged to extend about a portion of a fan chassis so that when installed, tension in the at least one elastic band operates to secure the frame body to a fan.

In one embodiment, the frame body is unitary.

In another embodiment, the frame body is formed in a straight-pull injection molding process.

In another embodiment the first and second side channels of the frame body are formed as separate units that are mounted together.

In another embodiment, the frame body further includes at least one cross member between the first and second side channels that provides lateral rigidity to the frame body.

In another embodiment, the first and second side channels each comprise a side surface of the frame body and tabs that extend from the frame body in a horizontal direction to define the first and second side channels.

In another embodiment, the stop is positioned at a bottom of at least one of the first and second side channels. In another embodiment, the stop further comprises a portion of the frame body that extends in a horizontal direction between the first and second side channels. In another embodiment, the stop comprises a horizontal channel extending in the horizontal direction between bottom portions of the first and second side channels.

In another embodiment, the at least one elastic band comprises a plurality of elastic bands, each coupled at both ends to the frame body.

In another embodiment, the at least one elastic band comprises a plurality of elastic bands, each coupled at one end to the frame body.

In another embodiment, each of the elastic bands of the plurality of elastic bands further comprises a hook at at least one end. The hook is constructed and arranged to couple the frame body to a grate of a grill of a fan.

In another embodiment, each of the elastic bands of the plurality of elastic bands comprises a hook at a first end and a plurality of holes at a second end and the frame body further comprises knobs. The plurality of holes at the second end of each of the plurality of elastic bands is adapted to mate with one of the knobs to define a length of each of the elastic bands between the knob of the frame body and the hook.

In another embodiment, the at least one elastic band is removably coupled at at least one end to the frame body.

In another embodiment, the at least one elastic band is fixed at at least one end to the frame body.

In another embodiment, the first and second side channels are constructed to have a depth such that multiple filters inserted in the frame body.

In another embodiment, the removable filter frame further comprises a coupler extending from the frame body in a direction transverse to longitudinal axes of the first and second side channels. The coupler is constructed and arranged to couple the frame body to a grill of a fan.

In another embodiment, the coupler comprises at least one tab that extends from the frame body and is constructed and arranged to couple the frame body to a grate of a grill of a fan.

In another embodiment, the coupler comprises at least one hook that extends from the frame body and is constructed and arranged to couple the frame body to a grate of a grill of a fan. In another embodiment, the at least one hook is spring-loaded.

In another embodiment, the coupler comprises one of multiple fasteners, multiple elongated bolts, and multiple cable ties that extend from the frame body and are constructed and arranged to couple the frame body to a grate of a grill of a fan.

In another aspect, the present invention is directed to grill for a fan. A latticed grate includes cross members and openings and has an inner surface and an outer surface. Retaining members extend from the outer surface of the grate in a direction transverse to the outer surface at first and second outer regions of the grill to define opposed first and second side channels. The first and second side channels define a slot for insertion of an air filter. The slot has an upper end that allows for insertion and removal of an air filter, and a lower end that includes a stop for restricting further movement of an inserted air filter.

In one embodiment, the grate and the retaining members are formed in a molding process so that they are unitary. In another embodiment, the grate and the retaining members are formed in a straight-pull injection molding process.

In another embodiment, the retaining members are L-shaped. A first portion of each retaining member extends from the outer surface in a direction transverse to the outer surface and a second portion of each retaining member extends from the first portion of the retaining member in a direction substantially parallel to the outer surface and toward a middle region of the grate.

In another embodiment, the stop is L-shaped. A first portion of the stop extends from the outer surface in a direction transverse to the outer surface and a second portion of the stop extends from the first portion of the stop in a direction substantially parallel to the outer surface and toward a middle region of the grate.

In another embodiment, the stop is integrated into the retaining members at a low end of the slot.

In another embodiment, each of the first and second side channels includes multiple retaining members.

In another embodiment, each of the first and second side channels includes a single retaining member.

In another embodiment, the stop comprises multiple stops.

In another aspect, the present invention is directed to a fan. The fan includes fan blades and a motor that operates the fan blades. A fan chassis surrounds the motor and fan blades. Front and rear grills shield the fan blades and allow for air movement through the fan. Each of the front and rear grills includes a latticed grate having cross members and openings and has an inner surface and an outer surface. Retaining members extend from the outer surface of the grate of at least one of the front and rear grills in a direction transverse to the outer surface at first and second outer regions to define opposed first and second side channels. The first and second side channels define a slot for insertion of an air filter. The slot has an upper end that allows for insertion and removal of an air filter, and a lower end that includes a stop for restricting further movement of an inserted air filter.

In one embodiment the grate and the retaining members are formed in a molding process so that they are unitary.

In another aspect, the present invention is directed to a method of mounting a filter to a fan. The method includes coupling a frame body having opposed first and second side channels, each of the first and second side channels having a longitudinal axis, to a grill of a fan by couplers extending from the frame body in a direction transverse to the longitudinal axes of the first and second side channels. The couplers engage a grate of the grill through an opening in the grate. The first and second side channels define a slot for insertion of an air filter. The slot has an upper end that allows for insertion and removal of an air filter, and a lower end that includes a stop for restricting further movement of an inserted air filter. An air filter is inserted into an upper end of the slot.

In one embodiment, coupling the frame body to the grill of the fan further comprises coupling the frame body to a grate of the grill of the fan using at least one tab extending from the frame body.

In another embodiment, coupling the frame body to the grill of the fan further comprises coupling the frame body to a grate of the grill of the fan using at least one hook extending from the frame body. In another embodiment, the at least one hook is spring-loaded.

In another aspect, the present invention is directed to a method of mounting a filter to a fan. The method comprises coupling a frame body having opposed first and second side channels to a grill of a fan by at least one elastic band extending about a portion of a fan chassis so that when installed, tension in the at least one elastic band operates to secure the frame body to a fan. The first and second channels define a slot for insertion of an air filter. The slot has an upper end that allows for insertion and removal of an air filter, and a lower end that includes a stop for restricting further movement of an inserted air filter. An air filter is inserted into an upper end of the slot.

In another aspect, the present invention is directed to a method that comprises forming a grill for a fan including a latticed grate including cross members and openings and having an inner surface and an outer surface. The method further comprises forming retaining members that extend from the outer surface of the grate in a direction transverse to the outer surface at first and second outer regions of the grill to define opposed first and second side channels. The first and second side channels define a slot for insertion of an air filter. The slot has an upper end that allows for insertion and removal of an air filter, and a lower end that includes a stop for restricting further movement of an inserted air filter. The method further comprises mounting the grill to a fan chassis.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A is a perspective view of a filter frame including elastic bands and FIG. 1B is a perspective view of the filter frame of FIG. 1A attached to a box fan, in accordance with the present invention.

FIG. 2A is a perspective view of an elastic band including an array of holes. FIG. 2B is a perspective view of the elastic bands of FIG. 2A attached to a box fan. FIG. 2C is a perspective view of a filter frame including mounting knobs. FIG. 2D is a perspective view of the filter frame of FIG. 2C attached to the box fan of FIG. 2B by the elastic bands of FIG. 2A, in accordance with the present invention.

FIG. 3A is a perspective view of a filter frame attachable to a box fan using elastic bands that are attached to the frame at both ends of the bands. FIG. 3B is a perspective view of the filter frame of FIG. 3A attached to a grill of a box fan, in accordance with the present invention.

FIG. 5 is a perspective view of another embodiment of the present invention including a filter frame attachable to a grill of a box fan using a threaded fastener and bolt.

FIG. 6A is a perspective view of a standard cable tie and FIG. 6B is a perspective view of a filter frame attachable to a grill of a box fan using the standard cable tie of FIG. 6A, in accordance with the present invention.

FIG. 7 is a perspective view of another embodiment of the present invention, in which the filter frame includes first and second side members and no base member, and in which a foam pad is applied between the frame and the fan body, in accordance with the present invention.

FIG. 10A is a front view of another embodiment of a filter frame formed in a mold process. FIG. 10B is a close-up perspective view of a side edge of the filter frame of FIG. 10A.

FIG. 11A is a perspective view of another embodiment of the molded filter frame of FIGS. 10A and 10B including spring-loaded hooks for latching the filter frame to the grill of the fan. FIG. 11B is a close-up perspective view of a top corner of a rear face of the filter frame of FIG. 11A including the spring-loaded hooks. FIG. 11C is a close-up perspective view of a corner of a front face of the filter frame of FIG. 11A. FIG. 11D is a perspective view of the filter frame of FIG. 11A mounted to a fan body.

FIG. 12A is a perspective view of another embodiment of the molded filter frame of FIGS. 10A and 10B including spring-loaded hooks for latching the filter frame to the grill of the fan. FIG. 12B is a close-up perspective view of a bottom corner of a rear face of the filter frame of FIG. 12A including spring-loaded hooks. FIG. 12C is a close-up perspective view of a top corner of a rear face of the filter frame of FIG. 12A.

FIG. 13A is an embodiment of the filter frame integral with a fan grill attached to the fan body. FIG. 13B is a close-up perspective view of a side edge of the filter frame and the fan grill of FIG. 13A. FIG. 13C is an exploded perspective view of an embodiment of a box fan and fan grill with an integral filter frame. FIGS. 13D and 13E are assembled views of alternative embodiments of the fan grill with an integrated filter frame.

DETAILED DESCRIPTION OF PREFERRED EMBODIMENTS

Figure 1A:
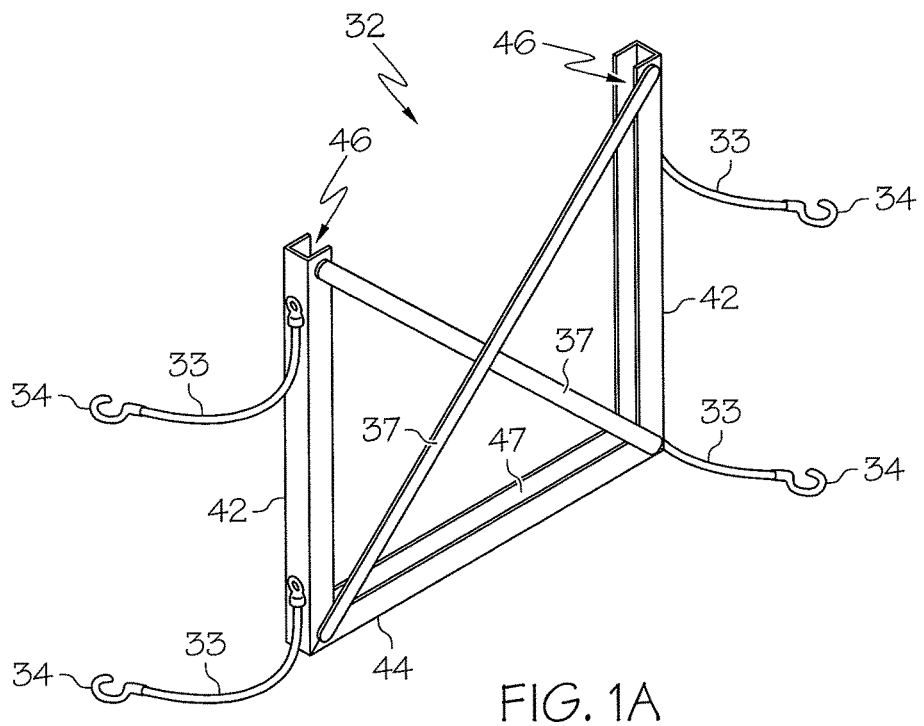
FIGS. 1A and 1B are perspective views of an embodiment of the present invention.

FIG. 1A is a perspective view of a filter frame 32 adapted to be secured to a body of a portable fan, such as a standard box fan, using elastic bands 33. A filter frame 32 is configured to include frame channels in a U-shaped arrangement having first and second side members 42 and a base member 44. Cross-members 37 are coupled between opposite corners of the frame to provide lateral rigidity. The first and second side members 42 include longitudinal channels 46 that are spaced apart and opposed, and that provide a slot or seat for receiving side edges of an inserted filter. The base member 44 extends between the first and second side members 42 and includes a similar longitudinal channel 47 that is aligned with the longitudinal channels 46 of the side members 42 for receiving a bottom edge of an inserted filter. Top portions of the side member frame channels 46 are open to provide an insertion and removal location for the filter. The side members 42, base member 44, and cross members 37 of the filter frame 32 comprise extruded aluminum, plastic, graphite, or other suitable light-weight and durable material that is molded or otherwise machined or formed. The members may be riveted, bolted, welded, or otherwise coupled together, or may be molded and formed as a complete unit.

Elastic bands 33 are permanently attached, at first ends, to a top right corner, bottom right corner, top left corner and bottom left corner of the filter frame 32. The elastic bands 33 are, for example, riveted, bolted, tied, or otherwise attached to the frame 32. The elastic bands 33 further include hooks 34, or other clasping mechanisms, at a second end. The elastic bands 33 comprise, for example, bungy cords, elastic ribbons, or straps. In alternative embodiments, the hooks 34 on the elastic bands 33 are tied, coupled to, or integral with, the elastic bands 33 at their second ends. The hooks 34 are preferably coated with a soft plastic or rubber material to avoid scratching the fan chassis.

The frame 32 is preferably sized to closely match, and cover, a standard-sized fan grill at an input or output face of the fan, so that a substantial amount of air flow induced by the fan passes through the inserted filter. The side members 42, base member 44 and cross members 37 of the filter frame are preferably sized to have a narrow profile so as to reduce the restriction of air flow. In one embodiment, the frame channels 46 are spaced apart a suitable distance, and foamed of a depth, so as to accommodate a general purpose forced-air filter, for example ¾" by 20" by 20" in size. The 20" by 20" filter profile matches well with a variety of box fan sizes. Therefore, the depth of the channel 46 in this example is made to be slightly larger than ¾" and the side members 42 are spaced apart slightly more than 20" in order to accommodate an inserted filter. Other filter sizes and other channel depths can also be applied to accommodate fans and filters of varying dimensions, and are equally applicable to the present invention.

Figure 1B:
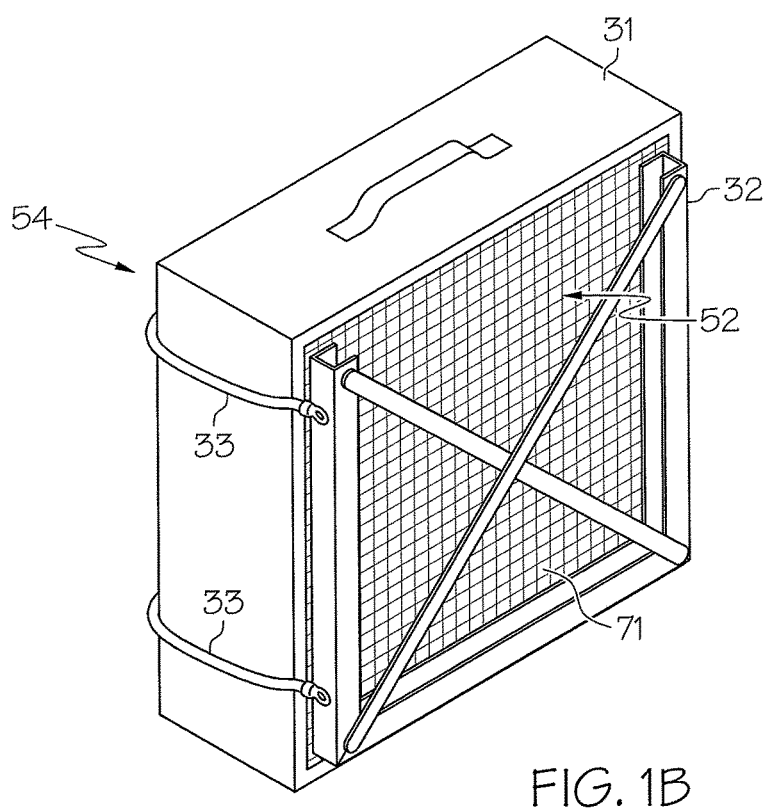

FIG. 1B is a perspective view of the filter frame 32 of FIG. 1A attached to a box fan 31. The frame 32 is positioned at a first face 52 of the box fan 31 and the elastic bands 33 are pulled about the sides of the fan chassis to a second face 54 of the fan 31. The hooks 34 are clasped to an existing feature of the box fan 31, for example a grate of a grill 71 on the second face 54 of the fan. Tension in the stretched elastic bands 33 retains the filter frame 32 against the fan body 31. Although the above described embodiment illustrates multiple bands 33 with hooks 34 at each of the first and second side members 42, each side member 42 can optionally include a single elastic band/hook, depending on the application. The elastic band configuration is equally applicable to any of the filter frame embodiments described herein.

Figure 2A:
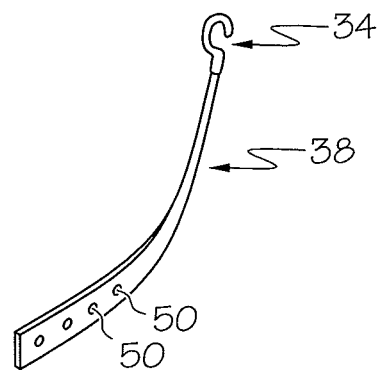
FIGS. 2A-2D are perspective views of another embodiment of the present invention.

FIGS. 2A-D are perspective views of another embodiment of the present invention. FIG. 2A is a perspective view of an elastic band 38 having a hook 34 at a proximal end and an array of holes 50 at a distal end. In one embodiment, the holes 50 are spaced ¾" apart and are distributed longitudinally along the end of the elastic band 38.

Figure 2B:
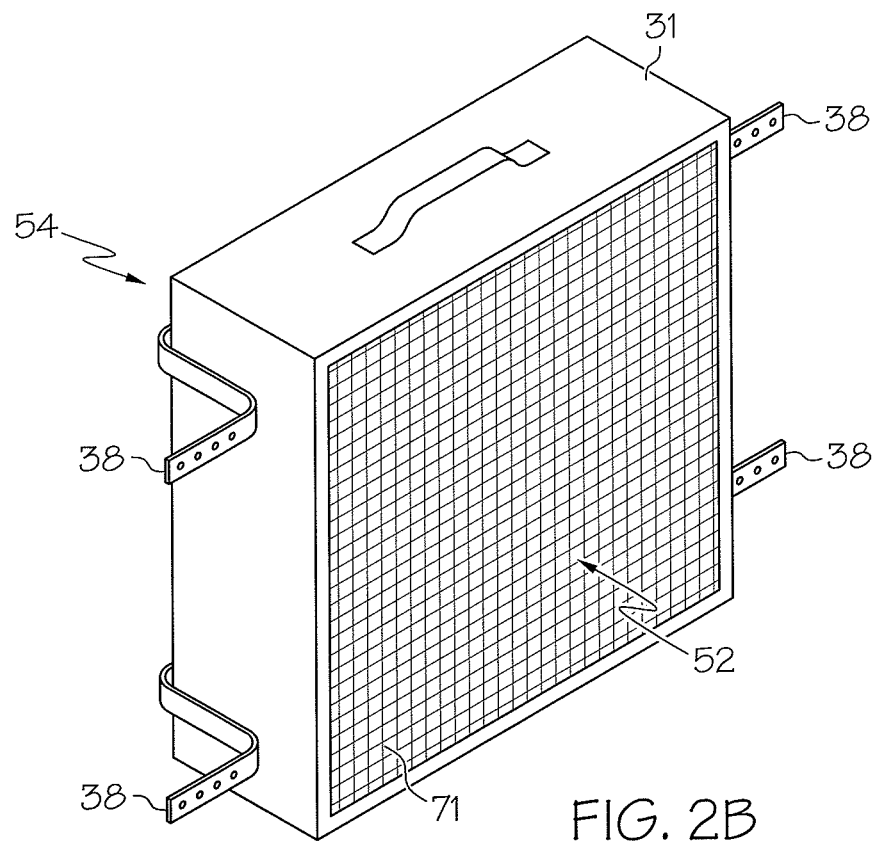

FIG. 2B is a perspective view of the elastic bands 38 of FIG. 2A hooked onto a grate of a grill 71 at a second face 54 of the box fan 31 at top right, bottom right, top left, and bottom left positions by the hooks 34.

Figure 2C:
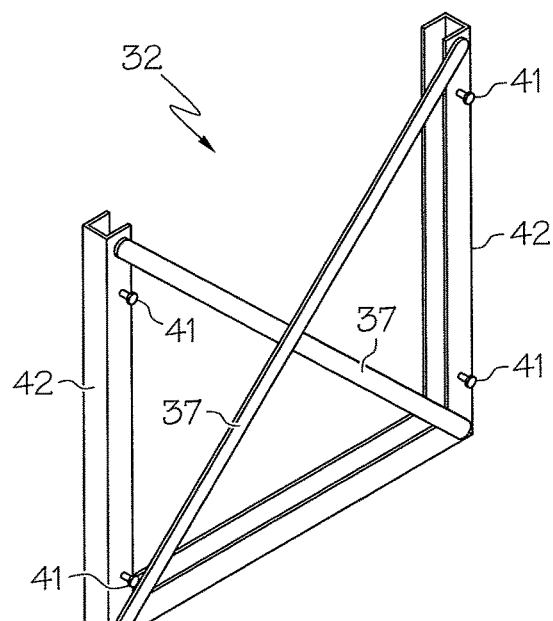

FIG. 2C is a perspective view of a filter frame 32 of a construction generally similar to that described above in FIG. 1A. In this embodiment, however, the elastic bands are not permanently attached. Instead, the filter frame 32 includes mounting knobs 41 that extend from the body of the frame 32 at top right, bottom right, top left and bottom left corners of the frame. The mounting knobs 41 have relatively narrow necks with relatively wide heads, such that when the holes 50 at the distal ends of the elastic bands 38, held in place at their proximal ends by the hooks 34, are pulled over the knobs 41, the elastic bands 38 are seated in position by the heads of the knobs 41.

Figure 2D:
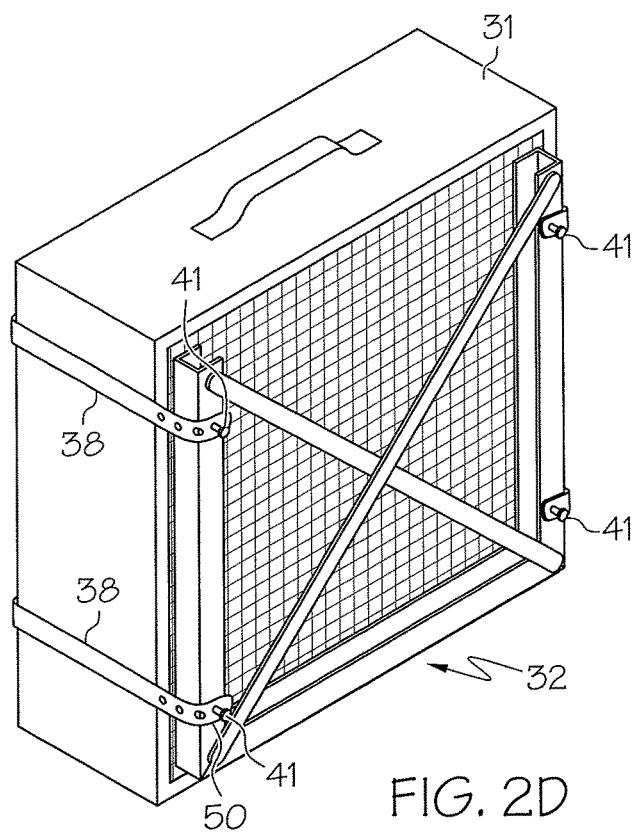

FIG. 2D is a perspective view of the filter frame of FIG. 2C attached to the box fan 31 of FIG. 2B by the elastic bands 38 of FIG. 2A. The holes 50 of the elastic bands 38 are pulled over the mounting knobs 41 of filter frame 32 to secure the four corners of the filter frame 32 to the box fan 31. Tension in the stretched elastic bands 38 retains the filter frame 32 against the body of the fan 31. Different holes 50 of the elastic bands 38 can be used to accommodate fan bodies 31 of different thicknesses, and to accommodate a range of different positions for hooking the hooks 34 on the grill, or other feature, of the fan. The mounting knob/elastic band configuration can be applied to any of the frame embodiments described herein.

In another embodiment, each of the upper and lower pairs of elastic bands 33, 38 of the FIG. 1 and FIG. 2 embodiments described above can be dimensioned in length so that their hooks 34, or other clasping features, can be coupled to each other to form one large band that extends about the fan chassis to secure the filter frame 32 in place.

Figure 3A:
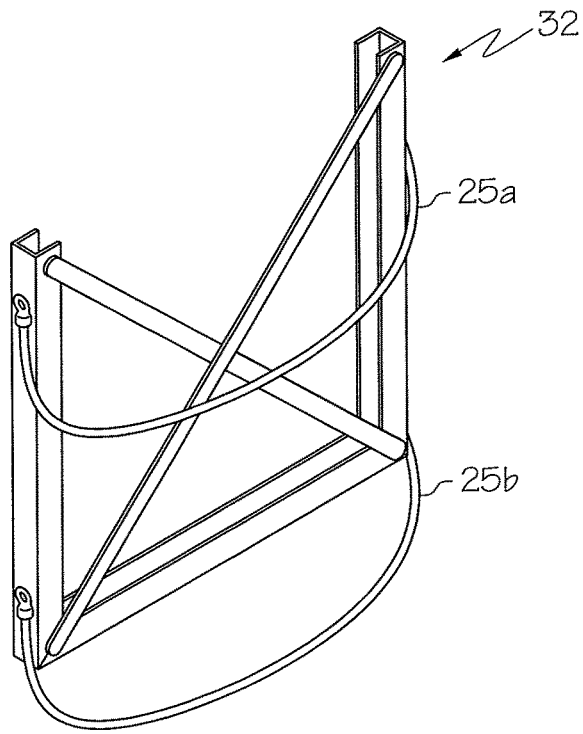
FIGS. 3A and 3B are perspective views of another embodiment of the present invention.
Figure 3B:
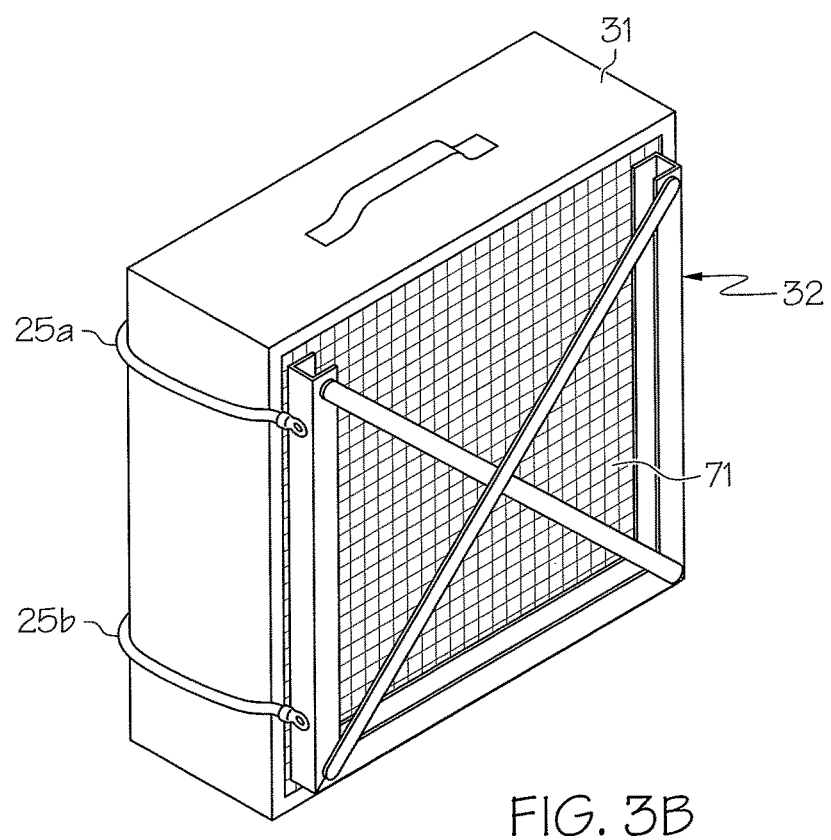

FIGS. 3A and 3B are perspective views of another embodiment of the present invention. FIG. 3A is a perspective view of a filter frame 32 attachable to a box fan using elastic bands. In this embodiment, the elastic bands 25a, 25b are permanently coupled to the opposed first and second side members 42 of the filter frame 32. A first elastic band 25a extends across the filter frame 32 from the top right corner to the top left corner, and a second elastic band 25b extends from the bottom right corner to the bottom left corner of the filter frame 32. When mounting the frame 32 to a box fan 31, as shown in FIG. 3B, the first elastic band 25a is pulled over the top of the box fan 31, and the second elastic band 25b is pulled over the bottom of the box fan 31. Alternatively, the first and second elastic bands 25a, 25b can both be pulled over the top or the bottom of the box fan 31 and positioned into place. The tension in the elastic bands 25a, 25b retains the filter frame 32 against the box fan 31. In alternative embodiments, one end, or both ends, of the elastic bands 25a, 25b are removable from the filter frame 32, for example using the holes and knobs combination described above with reference to FIGS. 2A-2D. This elastic band configuration is equally applicable to any of the filter frame embodiments described herein.

Figure 4:
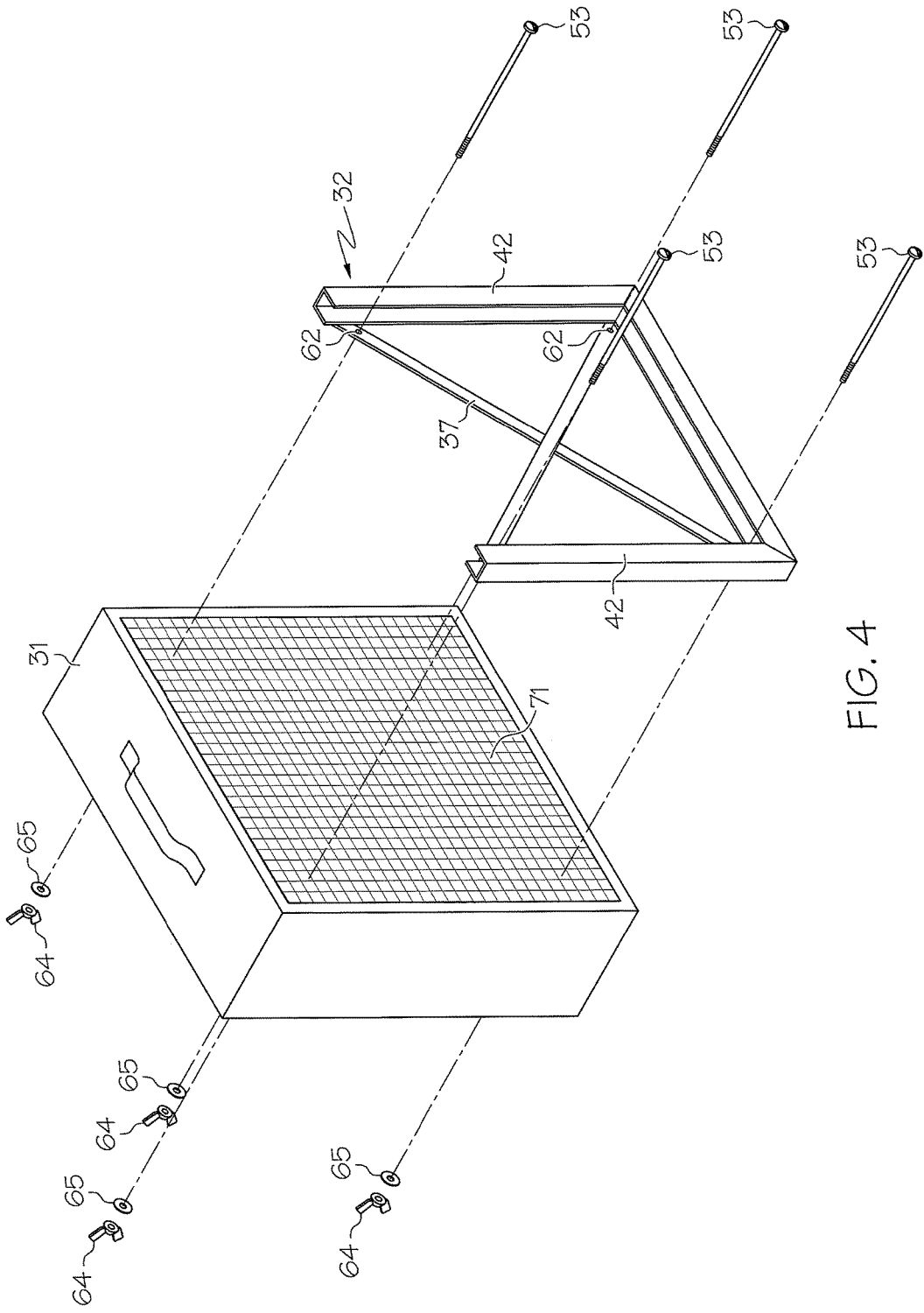
FIG. 4 is a perspective view of another embodiment of the present invention including a filter frame attachable to a grill of a box fan using elongated bolts, washers and wing nuts.

FIG. 4 is a perspective view of another embodiment of the present invention including a filter frame attachable to a grill of a box fan 31 using elongated bolts 53, washers 65 and wing nuts 64. In this embodiment, the filter frame 32 is secured to the fan chassis 31 by elongated bolts 53 that extend through the fan 31. For example, the bolts 53 can be configured to be of a length so as to extend through grate openings that exist in both the front and rear grills 71 of the fan 31. Holes 62 are included in the frame 32 at the cross members 37 or side members 42 to receive the bolts 53. The holes 62 are preferably elongated to allow for play in positioning the frame 32 relative to the fan body 31, so that the frame 32 is compatible with different fan grill configurations. The elongated bolts 53 are secured to the filter frame 32 and fan 31 with washers 65 and wing nuts 64, which, when tensioned, retain the filter frame 32 against the body of the fan 31. The holes 62 and bolts 53 are configured to align with the four corners of the fan grill, so as to avoid interference with fan operation. The bolts 53 are preferably of a length so as to accommodate fan bodies of different depths. Tightening the wing nuts 64 creates a tension in the bolts that retains the filter frame 32 against the fan body 31. The wing nuts 64 and bolts 53 are readily mountable by an individual without the need for tools. The elongated bolt and wing nut mounting configuration can be applied to any of the filter frame embodiments described herein.

FIG. 5 is a perspective view of another embodiment of the present invention including a filter frame 32 attachable to a grill of a box fan 31 using fasteners 18. The fasteners 18 are bolted to the frame 32, for example at cross-members 37 or side members 42. Holes 67 are included in the frame 32 to receive the bolts 66. The holes 67 are preferably elongated to allow for play in positioning the frame 32 relative to the fan body 31, so that the frame 32 is compatible with different fan grill configurations. A fastener 18 is inserted into a fan grill 71 in a horizontal position between cross members of the rear or front fan grill 71 of the fan, and is then rotated to a vertical position and tightened in place with bolt 66 to affix the filter frame 32 to the fan 31. The fastener 18 is sized to accommodate a range of fan grill configurations. The fastener 18 may include a threaded hole 68 to receive the bolt 66, or, optionally washers and nuts may be employed. Tightening the bolt 66 relative to the fastener 68 provides tension which holds the frame 32 against the box fan 31. The fastener configuration described in FIG. 5 is equally applicable to any of the filter frame embodiments described herein.

Figure 6A:
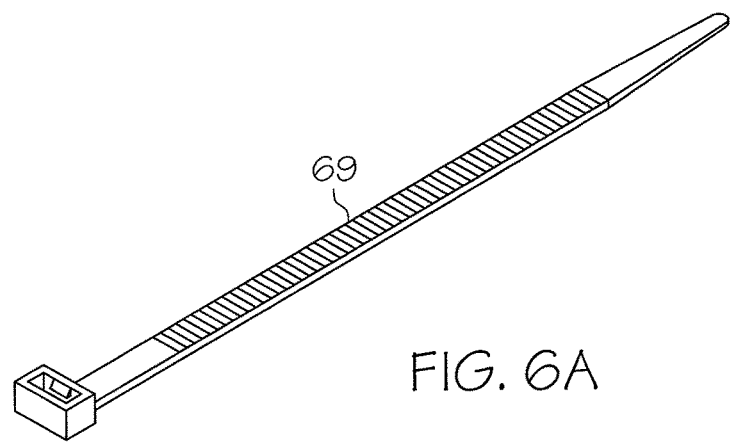
FIGS. 6A and 6B are perspective views of another embodiment of the present invention.
Figure 6B:
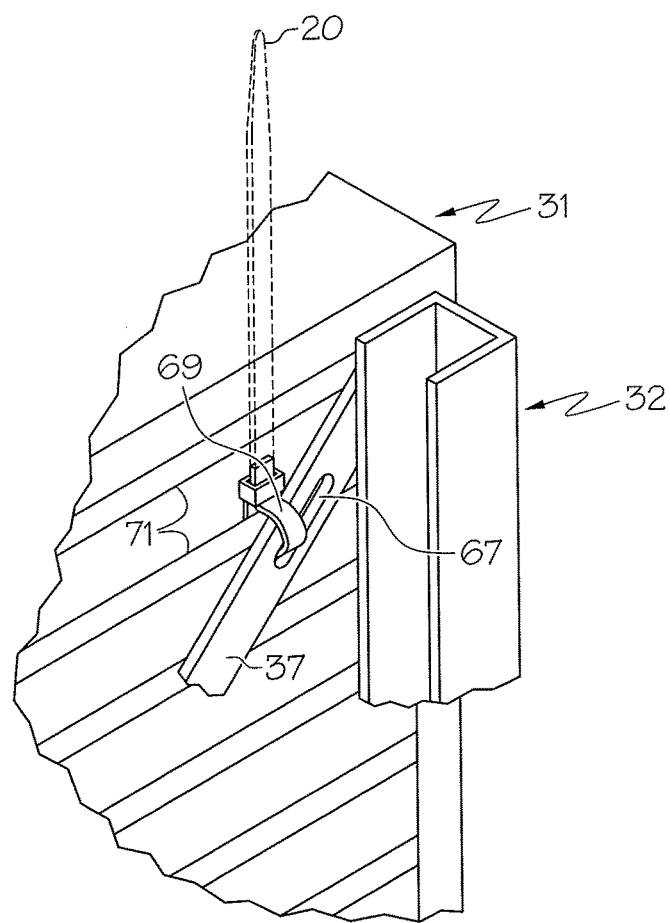

FIGS. 6A and 6B are perspective views of another embodiment of the present invention. In this embodiment, a plurality of standard cable ties 69 as shown in FIG. 6A are used to mount the filter frame 32 to the grill of the box fan 31 as shown in FIG. 6B. Holes 67, for example elongated holes, are formed in the cross members 37 or side members 42 of the frame 32, and standard cable ties 69 are wrapped around the holes 67 and a grate of the fan grill 71, and tightened, to secure the filter frame 32 against the fan grill 71. The excess portion of the cable tie 20 is preferably cut off to avoid vibration during fan operation, and to avoid interference with an inserted filter. The cable ties 69 are tightened so as to create sufficient tension to secure the filter frame 32 to the box fan 31. The cable tie configuration described in FIG. 6 is equally applicable to any of the filter frame embodiments described herein.

Figure 9:
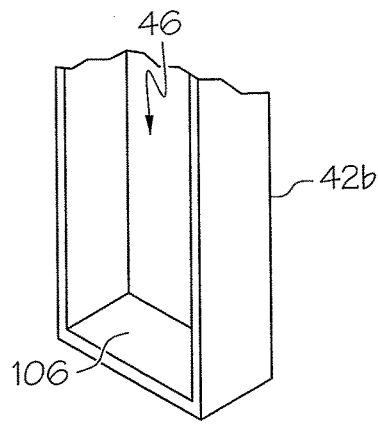
FIG. 9 is a close-up perspective view of a side member of the filter frame of FIGS. 7 and 8, including a channel stop at an end of the channel, in accordance with the present invention.

FIG. 7 is a perspective view of another embodiment of the present invention. In this embodiment, the filter frame 32 includes first and second side members 42A, 42B and no base member. In this embodiment, rather than including a base member 44 as shown in the above embodiments of FIGS. 1-6, the side members 42A, 42B of the present embodiment each include a channel stop 106 at or near a distal end of the channel 46, in order to limit or stop the insertion of a filter 100, as shown in FIG. 9. The channel stop 106 can take the form of a solid face, a mesh surface, a peg, a dimple, or any suitable means for restricting downward movement of the filter 100 in the channel 46. The channel stop structure can be applied to any of the filter frame embodiments described herein.

Further, in the embodiment of FIG. 7, a single pair of elastic bands 33 and hooks 34 is included for mounting the filter frame 32 to the fan body. A single pair of elastic bands 33 can be equally as effective as a double pair as shown above in FIGS. 1, 2 and 3 for securing the frame 32 to the fan body 31, depending on the application.

In addition, the embodiment of FIG. 7 includes an optional foam pad 108 or gasket that is applied between the filter frame 32 and the fan body 31. The foam pad 108 includes an opening 109 that allows free passage of air, the opening 109 being about as large as the cross-section of the volume of air that the fan is designed to push, so as not to restrict air flow. The foam pad 108 prevents air from entering the fan at a gap that may be present between the filter frame 32 and the surface of the fan body 31. In this manner, the foam pad 108 causes more of the air that is pushed by the fan to pass through the filter 100, thereby improving the air cleaning efficiency of the system. Further, if the foam pad 108 is cut to closely match the diameter of the fan blades, back draft in the corners of the box fan can be prevented. By preventing the back draft in the box fan, an air flow can be created that flows in a single direction, thus making the fan more efficient in configurations in which negative air pressure is created. The foam pad configuration can be applied to any of the filter frame embodiments described herein.

Figure 8:
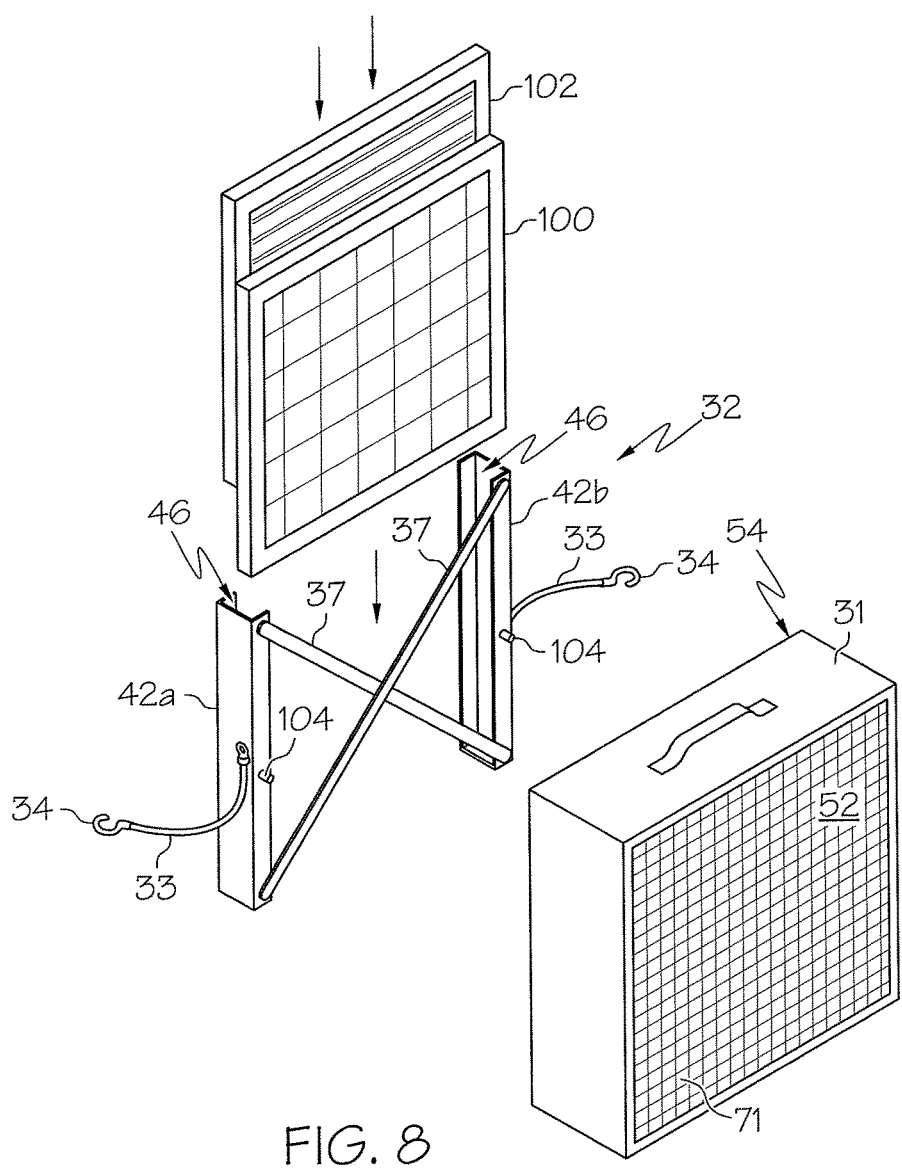
FIG. 8 is a perspective view of another embodiment of the present invention, in which the filter frame includes a widened channel that is adapted to receive both a universal filter and a HEPA-standard filter, in accordance with the present invention.

FIG. 8 is a perspective view of another embodiment of the present invention. In this embodiment, the filter frame 32 includes a widened channel 46. The channel 46 is widened so as to accommodate both a universal pre-filter 100 and a High Efficiency Particulate Air (HEPA) type filter 102, in accordance with the present invention. The widened channel 46, in one embodiment, is a single channel that is of a width so as to accommodate both the universal pre-filter 100 and the HEPA filter adjacent each other. In another embodiment, the channel 46 may comprise a double channel that includes a central rail for partitioning first and second slots of the channel. In this manner, either, or both, filters 100, 102 can be properly seated in designated slots of the channel 46. This widened channel configuration can be applied to any of the filter frame embodiments described herein.

Further, the embodiment of FIG. 8 includes pegs or bumps 104 that extend in a direction transverse to the longitudinal direction of the filter channels from a face of each side member 42A, 42B or optionally from the cross members 37 or other portion of the frame 32. The pegs 104 are adapted to rest in an opening between adjacent grates of the fan grill 71. The pegs 104 prevent the frame 32 from shifting or sliding in a downward direction when the frame 32 is mounted to the fan and prevent movement of the frame 32 relative to the fan as a result of vibration. In one embodiment, the pegs 104 are approximately ¼" in length. The peg configuration is equally applicable to any of the filter frame embodiments described herein.

Figure 10B:
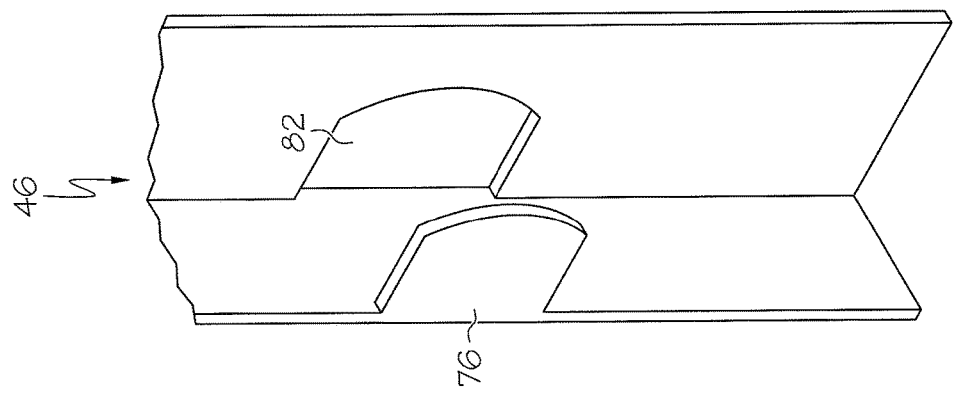
FIGS. 10A and 10B are illustrations of another embodiment of the present invention.
Figure 10A:
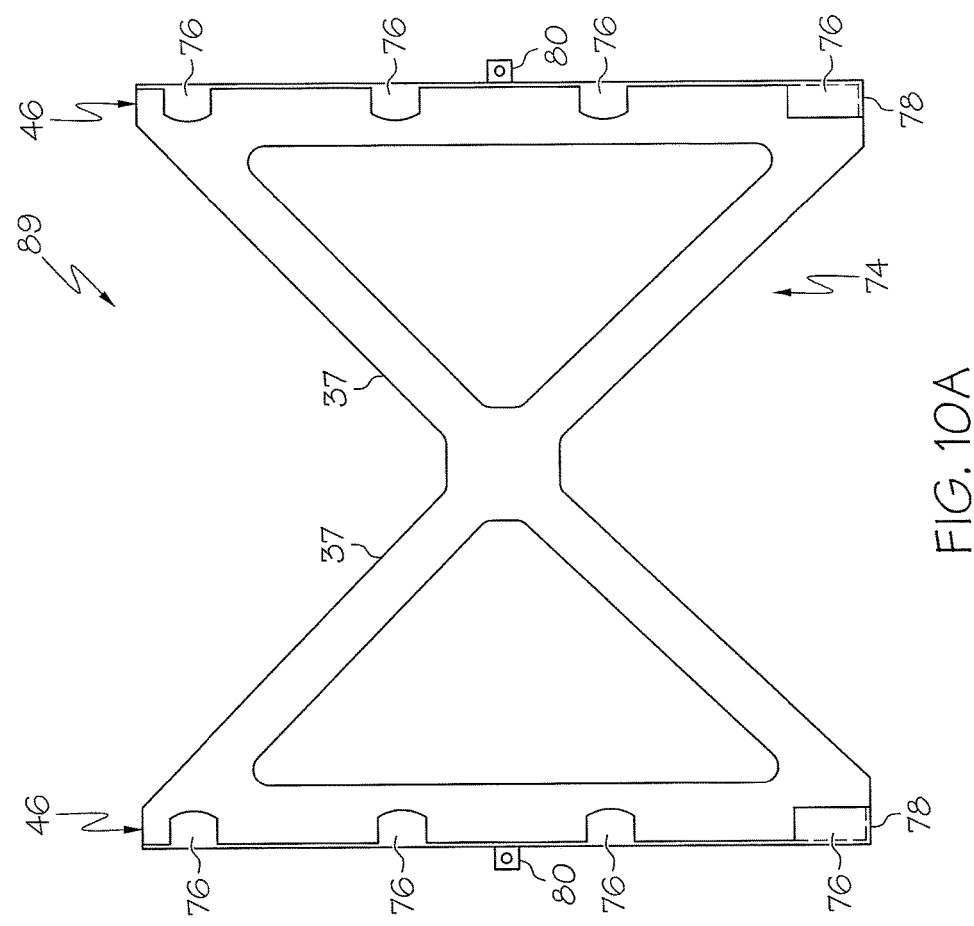

FIGS. 10A and 10B are illustrations of another embodiment of the present invention. FIG. 10A is a front view of another embodiment of a filter frame 74 that is suitable for formation in a mold process. This embodiment of the filter frame 74 includes first and second spaced-apart and opposing side channels 46 that are defined by a plurality of side channel tabs 76. The channels 46 provide a guide for receiving opposite edges of an inserted filter. The frame 74 further includes cross-members 37 that are coupled between opposite corners of the frame to provide lateral rigidity. The lowest side tabs 76 of the channels 46 are provided with bottom surfaces 78 that operate as a stop to limit the vertical position of the inserted filter. A top portion 89 of the frame 74 is open to provide an insertion and removal location for the filter. The left and right edges of the frame include mounts 80, each comprising an opening for attaching elastic bands, bolts and nuts, hooks, or other fastening means to secure the filter frame 74 to the fan body, for example in the manner of the other embodiments described herein.

FIG. 10B is a close-up perspective view of a side edge of the filter frame 74 of FIG. 10A. In this view it can be seen that a void 82 is provided in the channel 46 under each respective side tab 76. In this manner, the filter frame of the present embodiment can be formed in a straight-pull injection molding process, such that there are no secondary movements required inside the mold during the molding process. An extension formed in the lower mold passes through a region where the voids 82 are to be formed. When the upper and lower molds are in position, material is injected, and the extension formed in the lower mold defines a lower part of the side tabs 76. When the mold is retracted, the extensions pass through the voids that are formed below the tabs, so as to form the frame in a straight-pull injection molding process. In this embodiment, the side edges, side tabs 76, bottom surfaces 78, notches 80, and cross members 37 of the filter frame 74 comprise aluminum, plastic, composite, graphite, or other suitable light-weight and durable material that can be formed in a molding process. The molded filter frame of FIG. 10A formed in the straight-pull injection molding process is equally applicable to any of the filter frame embodiments described herein.

Figure 11A:
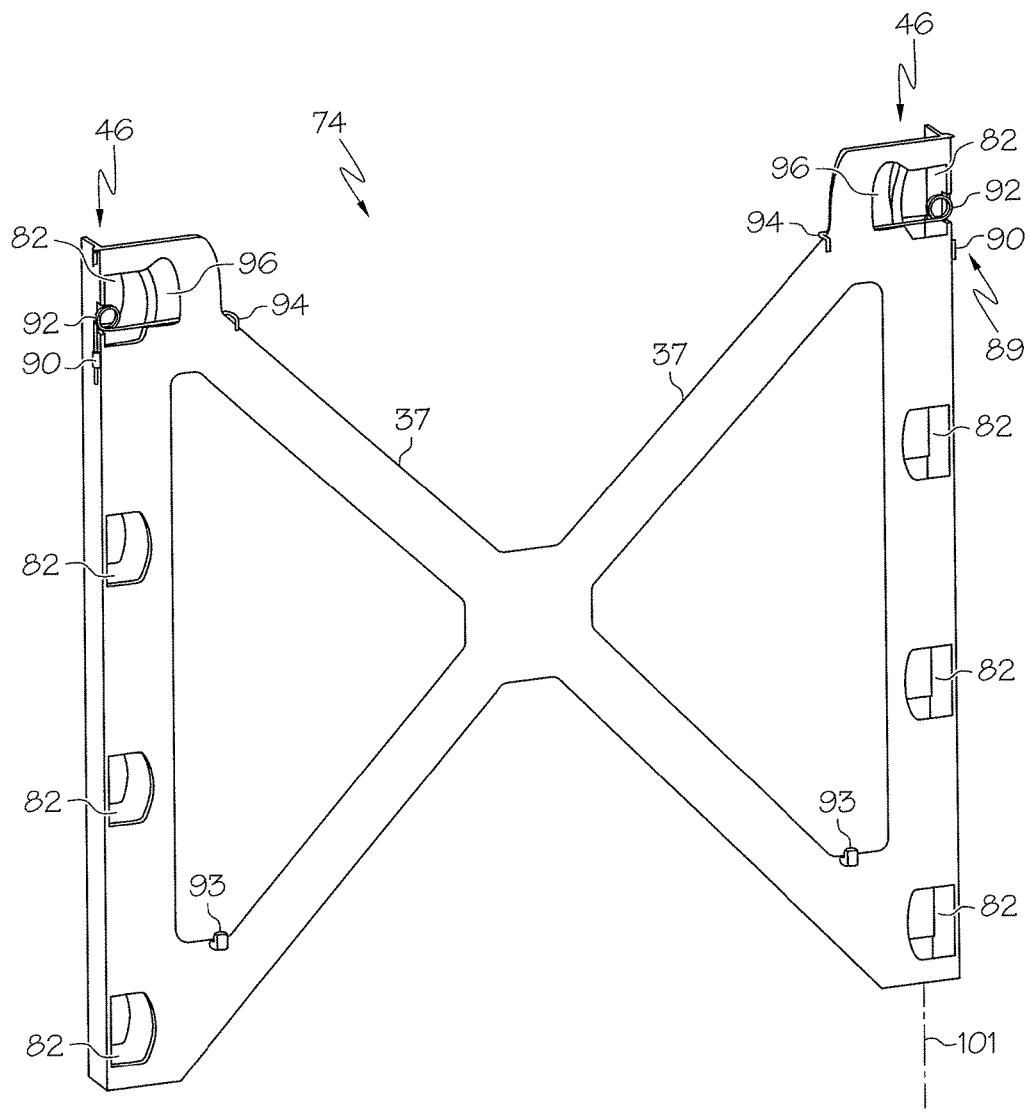
FIGS. 11A, 11B, 11C and 11D are perspective views of another embodiment of the present invention.
Figure 11B:
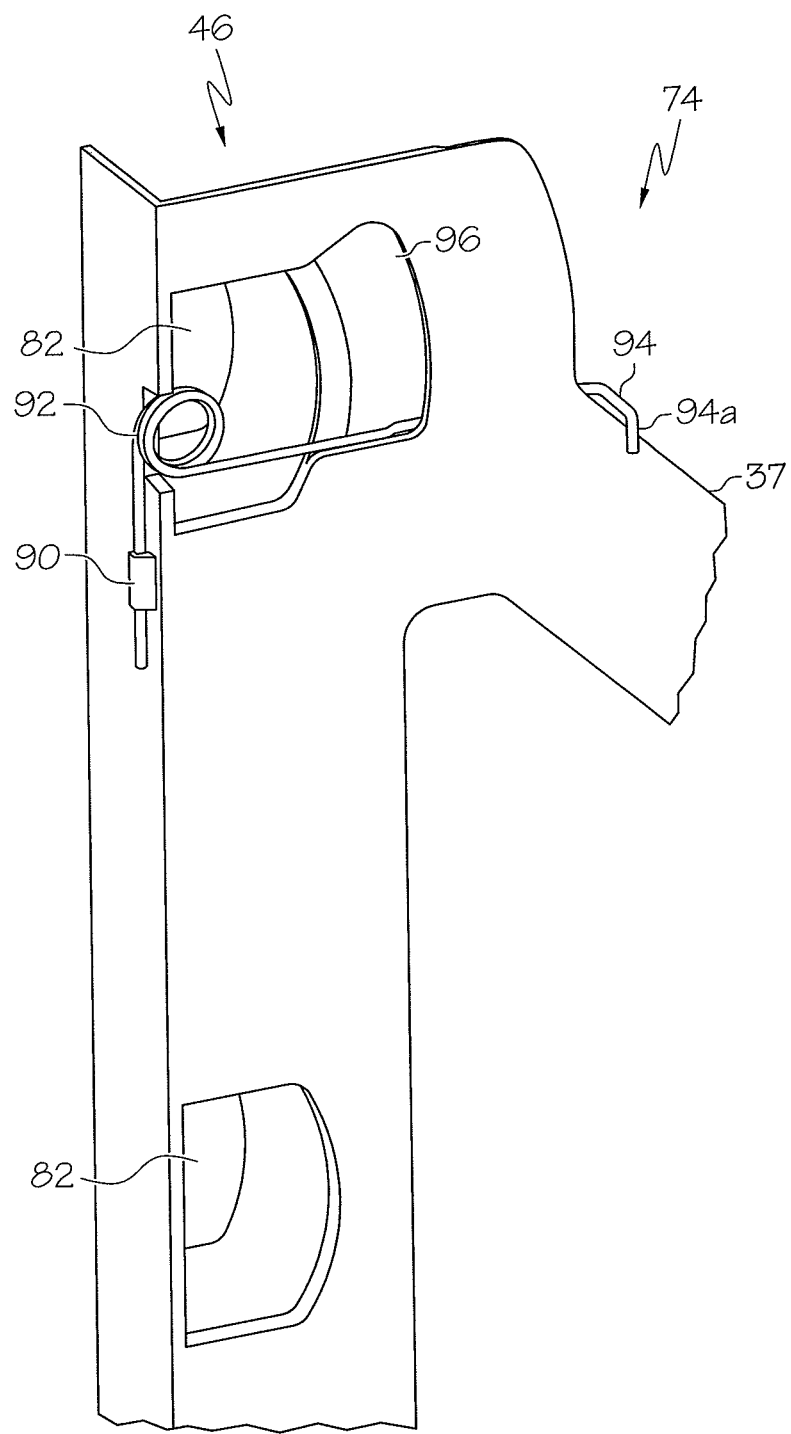
Figure 11C:
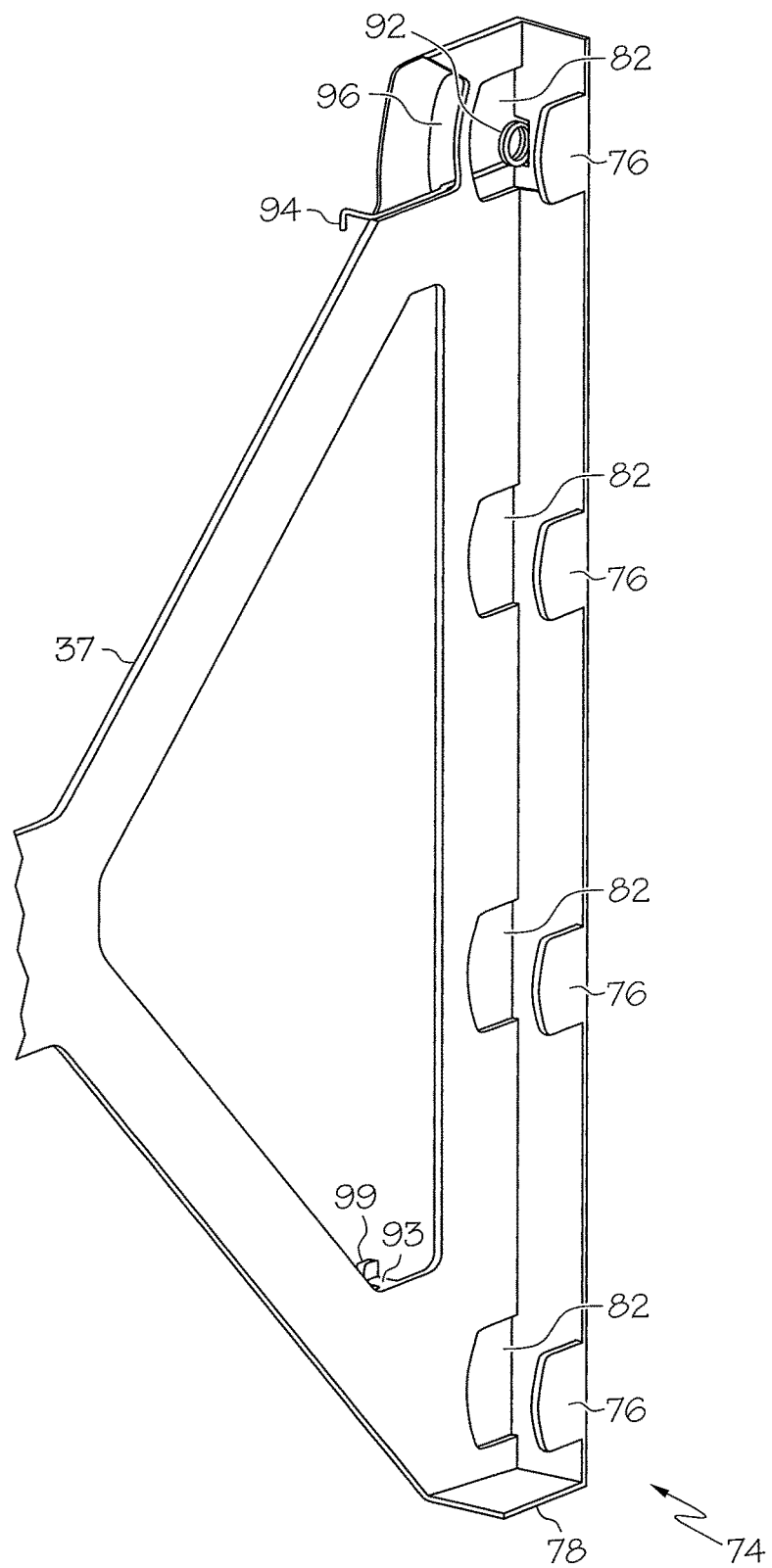
Figure 11D:
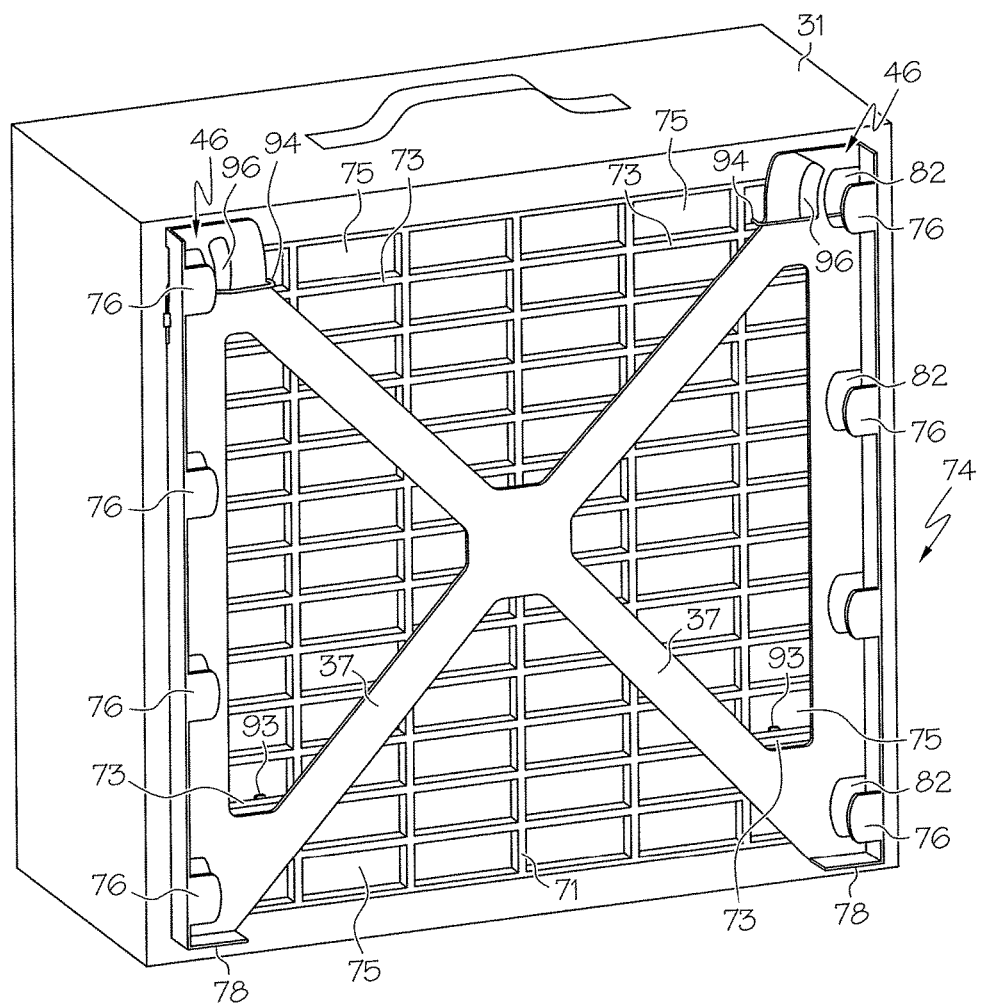

FIGS. 11A, 11B, 11C and 11D are perspective views of another embodiment of the present invention. FIG. 11A is a perspective view of another embodiment of the molded filter frame of FIGS. 10A and 10B including spring-loaded or spring-biased hooks for attaching the frame directly to a grill of the fan. FIG. 11B is a close-up perspective view of a top corner of a rear face of the filter frame 74 of FIG. 11A. FIG. 11C is a close-up view of a corner of a front face of the filter frame 74 of FIG. 11A. In this embodiment, springs 92 are attached to the top corners of the filter frame 74. A first end of each spring 92 is attached to the filter frame 74 at a spring seat 90, for example in a press-fit relationship, or alternatively by a fastener or adhesive. A second end of each spring 92 extends through a corresponding hole 96 at each top corner of the filter frame. In this embodiment, the second ends of the springs 92 include integral hooks 94. The hooks 94 are adapted to secure the filter frame 74 to the grate of the fan grill, and are shaped to interlock with features of common fan grills, for example rectangular openings and grates of the fan grill. The hooks 94 extend in a direction transverse to the longitudinal axes 101 of the channels 46, and fingers 94A at the ends of the hooks are configured to be inserted through an aperture in the fan grill and to latch a surface of the fan grill, for example an inner surface of a grate of the fan grill. In this manner, a top portion 89 of the filter frame 74 is removably secured to the fan body at the fan grill by a downward force of the springs 92. The filter frame 74 further includes lower tabs 93 at a bottom region of the filter frame 74. The lower tabs 93 can be integral with the filter frame 74 and can be molded on or otherwise attached to the filter frame 74. The lower tabs 93 are adapted to secure the filter frame 74 to the fan grill and are shaped to extend from the filter frame 74 in a direction transverse to the longitudinal axes 101 of the channels 46 of the filter frame 74 so as to interlock with a feature of a common fan grill, for example the openings and grates of the fan grill. Lips, or other interlocking features, that extend from the lower tabs 93 are adapted to latch with the inner surfaces of the grates of the fan grill, through openings in the grate. The lower tabs 93 operate to counteract the downward force of the springs 92. The tension between the springs 92 and the lower tabs 93 operates to retain the filter frame against the fan body 31. The present spring-loaded hook and tab configuration is applicable to any of the filter frame embodiments described herein. FIG. 11D is a perspective view of the filter frame 74 of FIG. 11A mounted to a fan body 31. Hooks 94 are inserted through apertures 75 of the fan grill and interlocked with the cross-members of the grate 73 of the fan grill 71. Lower tabs 93 extend through apertures 75 of the fan grill and are latched with the inner surfaces of the grates 73 of the fan grill 71.

Figure 12A:
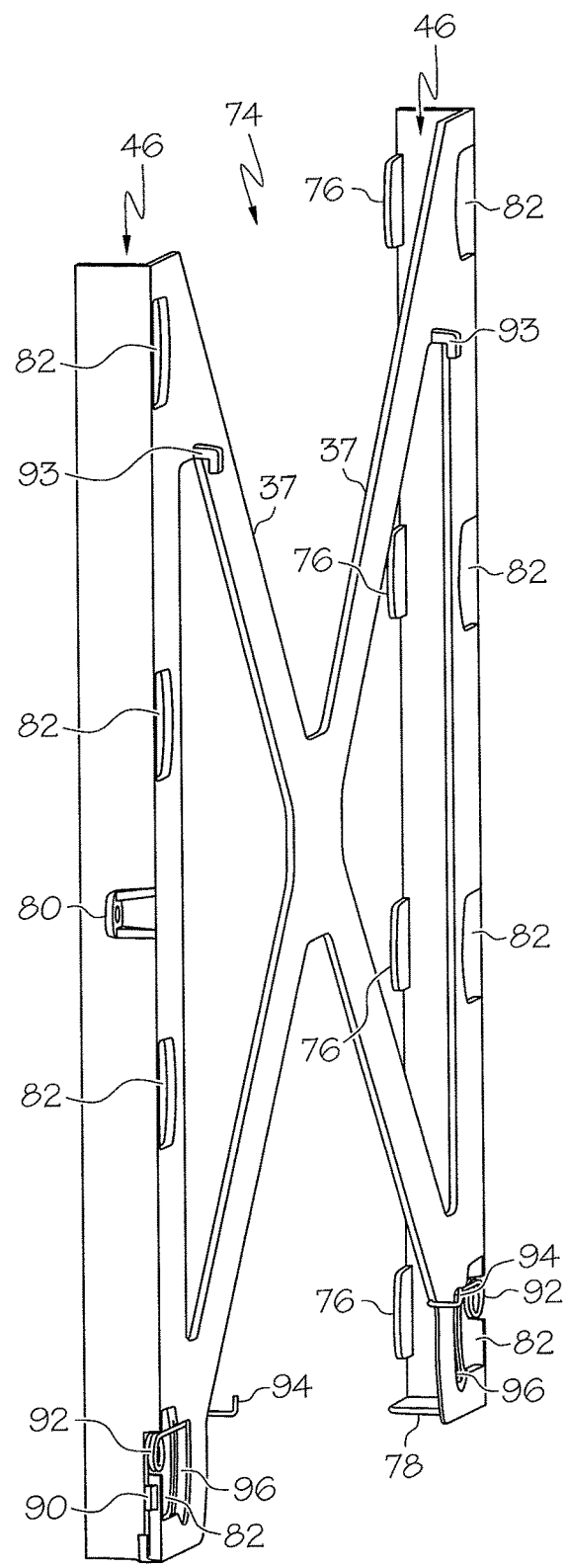
FIGS. 12A-12C are perspective views of another embodiment of the present invention.
Figure 12B:
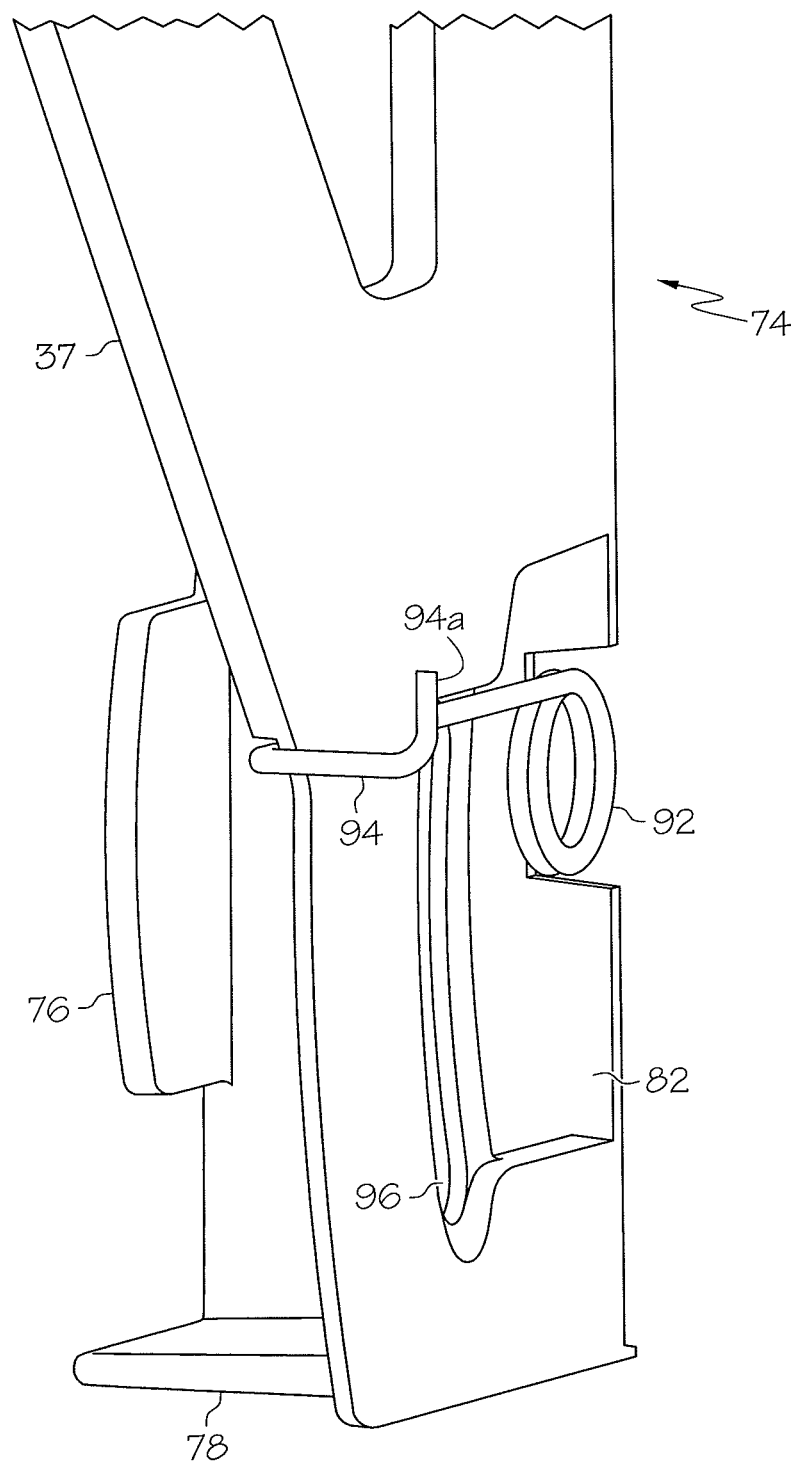
Figure 12C:
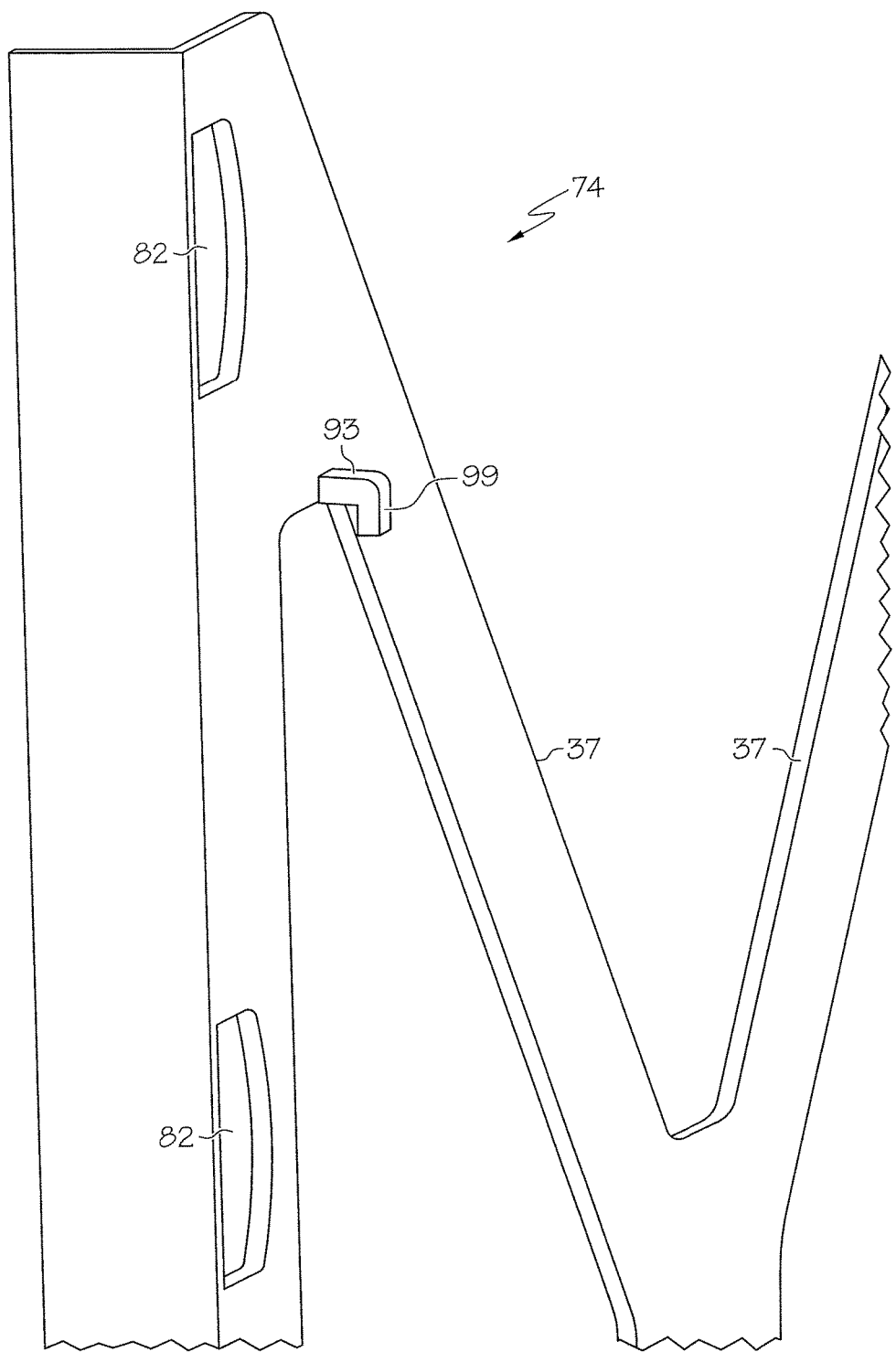

FIGS. 12A, 12B and 12C are perspective views of another embodiment of the present invention. FIG. 12A is a perspective view of another embodiment of the molded filter frame 74 of FIGS. 10A and 10B including spring-loaded or spring-biased hooks. FIG. 12B is a close-up perspective view of a bottom corner of a rear face of the filter frame 74 of FIG. 12A. FIG. 12C is a close-up of a top corner of a rear face of the filter frame 74 of FIG. 12A. This embodiment is similar in structure and form to the embodiment of FIG. 11 above, except that in this embodiment, the tabs 93 are at an upper portion of the filter frame 74 and the springs 92 are at lower portion of the filter frame 74. In the present embodiment, the tabs 93 include fingers 99 that are oriented in a downward direction, and therefore, when inserted in a grate of a fan grill, through an opening in the grate, the tabs 93 bear the weight of the filter frame 74 and mounted filter. The springs 92 include upward-oriented hooks which, when engaged with the grate of the fan grill, operate to hold the filter frame 74 in place against the grill. Mounts 80 are also included at far left and right edges of the filter frame 74 for further mounting the frame to the fan body using optional elastic bands, as described above. The present embodiment can be applied to any of the filter frame embodiments described herein.

Figure 13A:
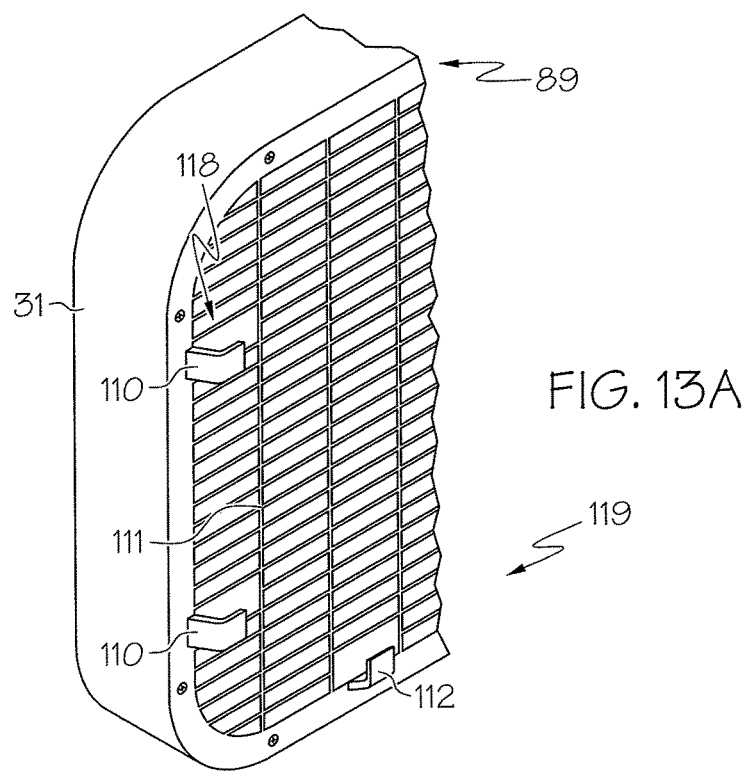
FIGS. 13A-13E are perspective views of another embodiment of the present invention.
Figure 13B:
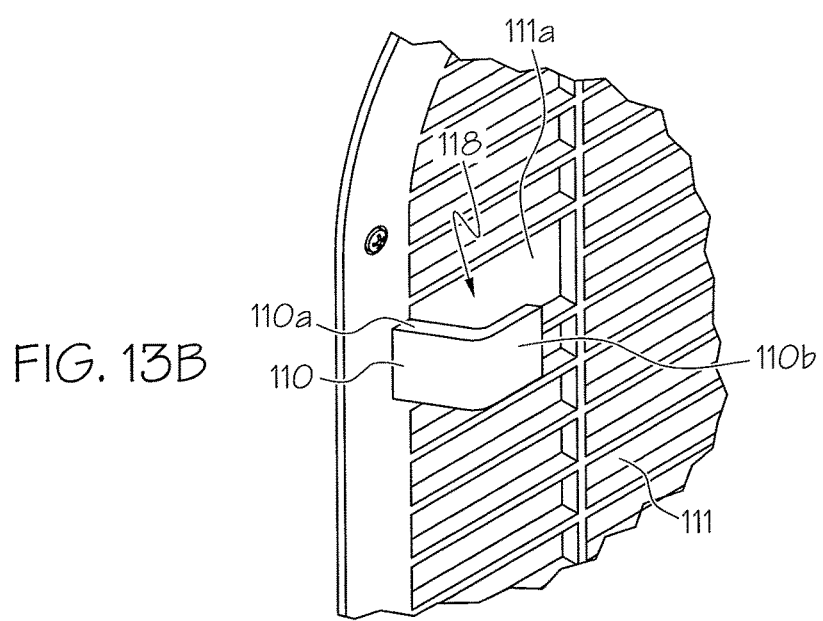
Figure 13C:
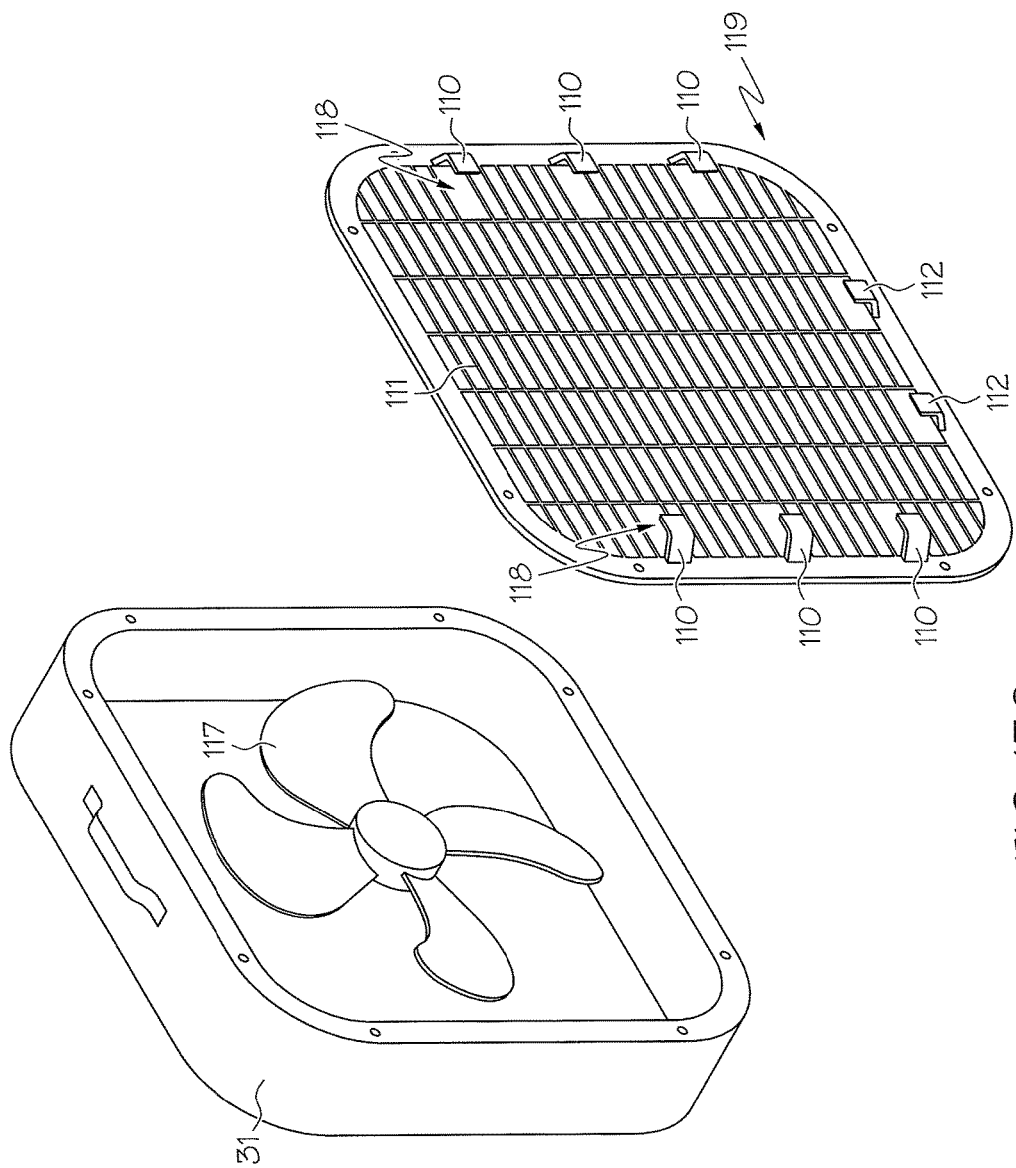

FIGS. 13A-13E are perspective views of another embodiment of the present invention in which a filter frame is integral with a fan grill of the fan body. Referring to FIG. 13A, the grill 111 includes a latticed grate that includes cross members and openings. The grill 111 of the box fan 31 includes multiple side tabs 110 that form first and second side channels 118 and multiple bottom tabs 112 that form a base channel 119. The side tabs 110 operate as retaining members for an inserted filter, and extend outwardly from the grill 111 surface in a direction transverse to a longitudinal axis of the first and second side channels 118, and then in an inward direction toward a center of the grill. The bottom tabs 112 operate as stops for an inserted filter and, in the embodiment shown in FIG. 13A, extend from the surface of the fan grill 111 in a manner similar to the side tabs 110. The side and bottom tabs 110, 112 are molded with the grill 111 of the box fan 31, such that the filter frame and the grill 111 of the box fan are unitary. The side tabs 110 and bottom tabs 112 in combination provide a slot or seat for securing an inserted filter to the grill 111 of the box fan 31. The side channels 118 are spaced apart, as described above, and are dimensioned to provide a seat for receiving opposite edges of an inserted filter. The bottom tabs 112 operate as a stop at a bottom portion of the slot to provide a location for vertical positioning of the inserted filter. A top portion 89 of the slot provided by the filter frame is open to provide an insertion and removal location for the filter. With reference to FIG. 13B, in an alternative embodiment, the side tabs 110 can be molded directly to the grill 111. The side tabs 110 each include a first portion 110a that extends in an outward direction from the surface of the fan grill and a second portion 110b that extends from the first portion 110a in a direction toward a central region of the fan, for example L-shaped, so as to form a channel 118. The tabs 110, 112 and underlying voids 111a are preferably shaped so as to accommodate a straight-pull injection molding process for forming the grill 111, as described above. FIG. 13C is an exploded perspective view of an embodiment of a box fan and fan grill including an integral filter frame. The box fan has fan blades 117 and a motor for operating the fan blades 117. A fan chassis surrounds the fan blades and motor. The fan grill shields the fan blades 117 and allows for air movement through the fan. The filter frame may be integral with the front grill, the rear grill, or both the front and rear grills of the box fan 31.

Figure 13E:
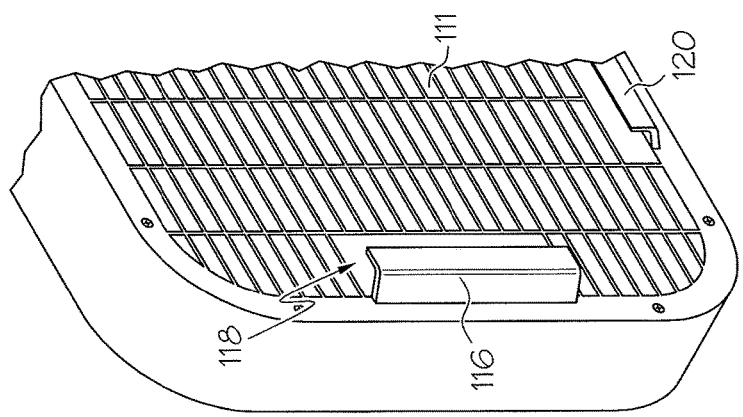
Figure 13D:
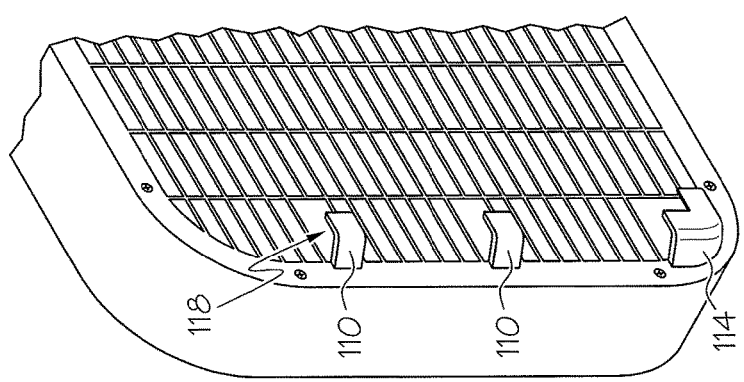

With reference to FIG. 13D, the side tabs 110 are integral with the grill 111. In this embodiment, the lowest side tabs 110 of the channels 118 are provided with bottom surfaces 114 that operate as a stop to prevent further insertion of the filter. Therefore, in this embodiment, additional bottom tabs are not necessary.

FIG. 13E is an assembled view of another embodiment of the grill 111 with an integrated filter frame including single, elongated, left and right side tabs 116 and a single bottom tab 120, rather than multiple tabs as shown above.

In one embodiment of a method of mounting a filter to a fan 31, the method includes coupling the filter frame 32, 74 that has opposed first and second side channels 46, each of the first and second side channels 46 having a longitudinal axis, to a grill 71 of a fan by couplers, for example elongated bolts 53 and wing nuts 64, fasteners 18, cable ties 69, hooks 94 or tabs 93, extending from the frame body in a direction transverse to the longitudinal axes of the first and second side channels 46. The couplers engage a grate 73 of the grill 71 through an opening 75 in the grate. The first and second side channels 46 define a slot for insertion of an air filter. The slot has an upper portion 89 that allows for insertion and removal of an air filter, and a lower end that includes a stop 44, 106, 78, for restricting further movement of an inserted air filter. An air filter 100, 102 is inserted into an upper end of the slot. Coupling the frame body to the grill of the fan optionally further includes coupling the frame body to the grate 73 of the grill of the fan using at least one tab 93 extending from the frame body 32, 74. Further, coupling the frame body 32, 74 to the grill of the fan optionally further includes coupling the frame body to the grate 73 of the grill of the fan using at least one hook 94 extending from the frame body 32, 74.

In another embodiment of a method of mounting a filter to a fan 31, the method includes coupling a frame body 32, 74 having opposed first and second side channels 46 to a grill of a fan by at least one elastic band 33, 38, 25a, 25b extending about a portion of a fan chassis so that when installed, tension in the at least one elastic band 33, 38, 25a, 25b operates to secure the frame body to the fan 31. The first and second channels 46 define a slot for insertion of an air filter. The slot has an upper portion 89 that allows for insertion and removal of an air filter, and a lower end that includes a stop 44, 106, 78 for restricting further movement of an inserted air filter. An air filter 100, 102 is inserted into an upper end of the slot.

In another embodiment, a method for forming a grill 111 for a fan 31 comprises forming a latticed grate including cross members and openings and having an inner surface and an outer surface. The method further includes forming retaining members 110, 116 extending from the outer surface of the grate in a direction transverse to the outer surface at first and second outer regions of the grill 111 to define opposed first and second side channels 118. The first and second side channels 118 define a slot for insertion of an air filter. The slot has an upper end that allows for insertion and removal of an air filter, and a lower end that includes a stop 112, 114, 120 for restricting further movement of an inserted air filter. The grill 111 is mounted to a fan chassis.

In this manner, the present invention provides a filter frame that can be readily mounted to and removed from a chassis of a fan, without causing permanent disfigurement of the fan body. In addition, the present invention provides a filter frame that is integrated into the grill of the frame, to further ease the application of a filter to a fan.

While this invention has been particularly shown and described with references to preferred embodiments thereof, it will be understood by those skilled in the art that various changes in form and details may be made herein without departing from the spirit and scope of the invention as defined by the appended claims.

The invention claimed is:

1. A removable filter frame for a fan, comprising:
a frame body including opposed first and second side channels, the first and second side channels defining a slot for insertion of an air filter, the slot having an upper end that allows for insertion and removal of an air filter, and a lower end that includes a stop for restricting further movement of an inserted air filter;
a first attachment position at the first side channel;
a second attachment position at the second side channel;
a first elastic band and a second elastic band coupled to the frame body at the first and second attachment positions respectively, the elastic bands constructed and arranged to extend about a portion of a fan chassis so that when installed, tension in the elastic bands operates to secure the frame body to a fan; and
a diagonal cross member coupled between the first side channel and the second side channel.

2. The apparatus of claim 1 wherein the elastic bands are removably attached to the frame body at the first and second attachment positions.

3. The apparatus of claim 2 further comprising hooks at proximal ends of the elastic bands to removably attach the elastic bands to the frame body at the first and second attachment positions.

4. The apparatus of claim 1 wherein the elastic bands are fixedly attached to the frame body at the first and second attachment positions.

5. The apparatus of claim 1 further comprising hooks at distal ends of elastic bands constructed and arranged to grasp a grate of a fan grill.

6. The apparatus of claim 1 wherein the diagonal cross member comprises a first diagonal cross member and further comprising a second diagonal cross member coupled between the first side channel and the second side channel and wherein the first and second diagonal cross members intersect.

7. The apparatus of claim 1
wherein the first attachment position comprises an upper first attachment position and a lower first attachment position;
wherein the second attachment position comprises an upper second attachment position and a lower second attachment position;
wherein the first elastic band comprises an upper first elastic band and a lower first elastic band coupled to the frame body at the upper first attachment position and the lower first attachment position respectively;

wherein the second elastic band comprises an upper second elastic band and a lower second elastic band coupled to the frame body at the upper second attachment position and the lower second attachment position respectively;

wherein the upper and lower first elastic bands and upper and lower second elastic bands are constructed and arranged to extend about a portion of a fan chassis so that when installed, tension in the elastic bands operates to secure the frame body to a fan.

8. The apparatus of claim 1 wherein the frame body, including the first and second attachment positions, is constructed and arranged to be formed in a straight-pull injection.

9. The apparatus of claim 1 wherein the frame body is unitary.

10. The apparatus of claim 1 further comprising side tabs defining each of the first and second side channels.

11. The apparatus of claim 10 wherein the side tabs of the first side channel comprise multiple side tabs spaced apart from each other, and wherein the side tabs of the second side channel comprise multiple side tabs spaced apart from each other.

12. The apparatus of claim 1 wherein the stop is positioned on a horizontal cross-member, the horizontal cross member positioned between the between the first channel and the second channel.

13. The apparatus of claim 12 wherein the stop extends in a horizontal direction continuously between the first channel and the second channel.

14. The apparatus of claim 1 wherein the stop comprises a first stop tab at a bottom of the first channel.

15. The apparatus of claim 14 wherein the stop further comprises a second stop tab at a bottom of the second channel.

16. A removable filter frame comprising:

a frame body having a first side channel having a first attachment position, a second side channel having a second attachment position, a horizontal cross member having a stop, and a first and second intersecting diagonal cross members coupled between the first side channel and the second side channel, the first and second side channels defining a slot for insertion of an air filter, the slot having an upper end that allows for insertion and removal of an air filter, and a lower end that includes a stop for restricting further movement of an inserted air filter, wherein:

the first attachment position comprises an upper first attachment position and a lower first attachment position; and the second attachment position comprises an upper second attachment position and a lower second attachment position;

a first elastic band and a second elastic band coupled to the frame body at the first and second attachment positions respectively, the elastic bands constructed and arranged to extend about a portion of a fan chassis so that when installed, tension in the elastic bands operates to secure the frame body to a fan, wherein:

the first elastic band comprises an upper first elastic band and a lower first elastic band coupled to the frame body at the upper first attachment position and the lower first attachment position respectively; and the second elastic band comprises an upper second elastic band and a lower second elastic band coupled to the frame body at the upper second attachment position and the lower second attachment position respectively; and hooks at distal ends of the first and second upper and lower elastic bands constructed and arranged to grasp a grate of a fan grill.

* * * * *